US011169685B2

(12) United States Patent
Louch et al.

(10) Patent No.: US 11,169,685 B2
(45) Date of Patent: Nov. 9, 2021

(54) METHODS AND APPARATUSES TO CONTROL APPLICATION PROGRAMS

(75) Inventors: John Louch, San Luis Obispo, CA (US); Eric S. Peyton, Lisle, IL (US)

(73) Assignee: APPLE INC., Cupertino, CA (US)

( * ) Notice: Subject to any disclaimer, the term of this patent is extended or adjusted under 35 U.S.C. 154(b) by 1327 days.

(21) Appl. No.: 13/197,552

(22) Filed: Aug. 3, 2011

(65) Prior Publication Data

US 2011/0296337 A1    Dec. 1, 2011

Related U.S. Application Data

(62) Division of application No. 11/499,006, filed on Aug. 4, 2006, now Pat. No. 7,996,789.

(51) Int. Cl.
*G06F 3/048* (2013.01)
*G06F 3/0486* (2013.01)

(52) U.S. Cl.
CPC .................. *G06F 3/0486* (2013.01)

(58) Field of Classification Search
CPC .... G06F 3/0481; G06F 9/4443; G06F 3/0482; G06F 3/04817; G06F 3/0483; G06F 3/0486; G06F 3/0484; G06F 3/048; G09G 5/14; G09G 2340/02; G09G 2340/12; H04N 5/44543
USPC ........................................ 715/835, 779, 781
See application file for complete search history.

(56) References Cited

U.S. PATENT DOCUMENTS

| 4,937,036 A | * | 6/1990 | Beard et al. ................. 345/156 |
| 4,939,507 A | * | 7/1990 | Beard et al. ................. 345/156 |
| 5,113,517 A | * | 5/1992 | Beard et al. ..................... 703/23 |
| 5,153,577 A | * | 10/1992 | Mackey et al. ............... 345/639 |
| 5,196,838 A | * | 3/1993 | Meier ................. G06F 3/04812 345/684 |
| 5,530,865 A | * | 6/1996 | Owens .................... G06F 9/451 719/313 |
| 5,546,527 A | * | 8/1996 | Fitzpatrick ............ G06F 3/0486 365/185.21 |
| 5,583,984 A |   | 12/1996 | Conrad et al. |
| 5,644,739 A | * | 7/1997 | Moursund ..................... 715/840 |

(Continued)

OTHER PUBLICATIONS

Adding icons to dock—MacOS for dummies 2nd edition 2003 by LeVitus; retrieved from http://www.dummies.com/how-to/content/adding-icons-to-the-dock-in-mac-os-x-jaguar.html on Aug. 8, 2014.*

(Continued)

*Primary Examiner* — Jung-Mu T Chuang
(74) *Attorney, Agent, or Firm* — Fernando & Partners, LLP

(57) ABSTRACT

Methods and apparatuses for controlling application programs are described. A first item and a docking interface having a second item are displayed on a screen space. A selection of the first item is received. A proxy of the first item is positioned over the second item. Next, a window is displayed in response positioning. An application is executing to display the window. In another embodiment, synchronizing a first docking interface on a first screen space of a first machine to a second docking interface on a second screen space of a second machine is performed. The first docking interface has an item that identifies a first application supported by the first machine and the second docking interface has another item that identifies a second application supported by the second machine.

17 Claims, 28 Drawing Sheets

(56) References Cited

U.S. PATENT DOCUMENTS

| | | | |
|---|---|---|---|
| 5,657,049 A | 8/1997 | Ludolph et al. | |
| 5,745,112 A * | 4/1998 | Hirose | 715/769 |
| 5,754,178 A * | 5/1998 | Johnston, Jr. | G06F 9/4443 715/769 |
| 5,757,371 A * | 5/1998 | Oran | G06F 3/0481 715/779 |
| 5,790,120 A * | 8/1998 | Lozares | G06F 9/45512 715/779 |
| 5,825,357 A * | 10/1998 | Malamud | G06F 3/0481 715/779 |
| 5,867,156 A | 2/1999 | Beard et al. | |
| 5,911,067 A * | 6/1999 | Owens et al. | 719/310 |
| 5,913,063 A * | 6/1999 | McGurrin et al. | 717/109 |
| 5,920,316 A * | 7/1999 | Oran | G06F 3/0482 715/779 |
| 5,949,417 A * | 9/1999 | Calder | G06F 3/0481 715/788 |
| 5,956,030 A * | 9/1999 | Conrad | G06F 3/0481 715/769 |
| 6,122,558 A * | 9/2000 | Barnes | G06F 9/451 700/83 |
| 6,133,898 A * | 10/2000 | Ludolph | G06F 3/0481 715/790 |
| 6,133,918 A * | 10/2000 | Conrad | G06F 3/0481 715/804 |
| 6,167,353 A * | 12/2000 | Piernot et al. | 702/94 |
| 6,215,490 B1 * | 4/2001 | Kaply | G06F 3/0481 715/788 |
| 6,336,146 B1 * | 1/2002 | Burridge | G06F 9/451 719/310 |
| 6,393,569 B1 * | 5/2002 | Orenshteyn | 726/4 |
| 6,433,800 B1 * | 8/2002 | Holtz | 715/835 |
| 6,456,306 B1 * | 9/2002 | Chin | H04L 41/0213 709/224 |
| 6,535,230 B1 * | 3/2003 | Celik | G06F 3/0486 715/769 |
| 6,535,930 B2 * | 3/2003 | Stern et al. | 719/329 |
| 6,544,295 B1 | 4/2003 | Bodnar | |
| 6,549,217 B1 * | 4/2003 | De Greef | G06F 9/44505 715/745 |
| 6,628,309 B1 * | 9/2003 | Dodson | G06F 3/0486 715/769 |
| 6,664,979 B1 * | 12/2003 | Schofield | G06F 9/44505 700/17 |
| 6,686,938 B1 * | 2/2004 | Jobs | G06F 3/0481 715/769 |
| 6,710,788 B1 * | 3/2004 | Freach | G06F 3/0481 715/778 |
| 6,885,363 B2 * | 4/2005 | Smith | G06F 3/012 345/156 |
| 6,928,464 B2 | 8/2005 | Appiah et al. | |
| 6,928,621 B2 * | 8/2005 | Conrad | G06F 3/0481 715/769 |
| 6,928,623 B1 * | 8/2005 | Sibert | G06F 40/174 715/783 |
| 6,976,224 B2 * | 12/2005 | Nii | 715/769 |
| 7,134,094 B2 * | 11/2006 | Stabb | G06F 3/0482 715/827 |
| 7,350,154 B2 * | 3/2008 | Anderson | G06F 3/0481 715/778 |
| 7,434,177 B1 * | 10/2008 | Ording | G06F 3/04842 715/862 |
| 7,472,157 B2 * | 12/2008 | Tolson | G06F 3/0486 705/41 |
| 7,546,602 B2 * | 6/2009 | Hejlsberg | G06F 9/54 717/114 |
| 7,549,126 B2 * | 6/2009 | Conrad | G06F 3/0481 715/769 |
| 7,650,575 B2 * | 1/2010 | Cummins | G06F 3/0486 715/769 |
| 7,665,028 B2 * | 2/2010 | Cummins | G06F 16/162 715/769 |
| 7,681,143 B2 * | 3/2010 | Lindsay | G06F 3/0481 715/788 |
| 7,730,427 B2 * | 6/2010 | Peters | G06F 3/0482 715/837 |
| 7,739,604 B1 * | 6/2010 | Lyons | G06F 3/0486 709/213 |
| 7,757,180 B2 * | 7/2010 | Nakai et al. | 715/769 |
| 7,757,182 B2 * | 7/2010 | Elliott | G06F 9/4443 715/716 |
| 7,814,430 B2 * | 10/2010 | McComber | 715/771 |
| 7,827,483 B2 * | 11/2010 | Unbedacht et al. | 715/256 |
| 7,865,845 B2 * | 1/2011 | Dettinger | G06F 3/0486 715/702 |
| 7,962,856 B2 * | 6/2011 | Lasker | G06F 8/20 715/769 |
| 7,987,432 B1 * | 7/2011 | Grechishkin | G06F 9/45537 715/778 |
| 7,996,789 B2 | 8/2011 | Louch et al. | |
| 8,127,253 B2 * | 2/2012 | Sauve et al. | 715/856 |
| 8,140,971 B2 * | 3/2012 | Branson et al. | 715/711 |
| 8,150,911 B2 * | 4/2012 | Bell et al. | 709/203 |
| 8,230,366 B2 * | 7/2012 | Chaudhri | G06F 3/04812 715/708 |
| 8,407,613 B2 * | 3/2013 | Hope | 715/769 |
| 8,621,395 B2 * | 12/2013 | Bau | 715/859 |
| 9,542,081 B2 * | 1/2017 | Ording | G06F 3/0484 |
| 9,684,436 B2 * | 6/2017 | Ording | G06F 3/04842 |
| 2002/0013895 A1 * | 1/2002 | Kelley | G06Q 10/087 713/1 |
| 2002/0015064 A1 * | 2/2002 | Robotham et al. | 345/863 |
| 2002/0054113 A1 * | 5/2002 | Conrad | G06F 3/0481 715/764 |
| 2002/0057295 A1 | 5/2002 | Panasyuk et al. | |
| 2002/0065946 A1 | 5/2002 | Narayan | |
| 2002/0087478 A1 | 7/2002 | Hudd et al. | |
| 2002/0099741 A1 * | 7/2002 | Watanabe | G06F 3/0481 715/210 |
| 2002/0191028 A1 * | 12/2002 | Senechalle | G09G 5/14 715/800 |
| 2003/0004977 A1 | 1/2003 | Gates et al. | |
| 2003/0046401 A1 | 3/2003 | Abbott et al. | |
| 2003/0142120 A1 * | 7/2003 | Nii | G06F 3/0486 715/700 |
| 2003/0158790 A1 * | 8/2003 | Kargman | G06Q 30/06 705/26.81 |
| 2003/0192049 A1 * | 10/2003 | Schneider | H04N 7/165 725/51 |
| 2003/0197739 A1 * | 10/2003 | Bauer | G09G 5/14 715/800 |
| 2003/0201982 A1 * | 10/2003 | Iesaka | G06F 1/1616 345/168 |
| 2004/0139401 A1 * | 7/2004 | Unbedacht et al. | 715/526 |
| 2004/0174396 A1 * | 9/2004 | Jobs | G06F 3/0481 715/810 |
| 2004/0184069 A1 * | 9/2004 | Mifune | H04N 1/00236 358/1.15 |
| 2004/0207723 A1 | 10/2004 | Davis et al. | |
| 2004/0216149 A1 * | 10/2004 | Reitz | G06F 17/2264 719/329 |
| 2004/0242269 A1 | 12/2004 | Fadell | |
| 2004/0268261 A1 * | 12/2004 | Elliott | G06F 9/4443 715/716 |
| 2005/0088410 A1 * | 4/2005 | Chaudhri | G06F 3/04812 345/157 |
| 2005/0188174 A1 * | 8/2005 | Guzak | G06F 17/30126 711/203 |
| 2005/0218739 A1 | 10/2005 | Maddin et al. | |
| 2005/0257163 A1 * | 11/2005 | Conrad | G06F 3/0486 715/769 |
| 2005/0268250 A1 * | 12/2005 | Skistimas | G06F 9/45512 715/810 |
| 2006/0015818 A1 | 1/2006 | Chaudhri et al. | |
| 2006/0041847 A1 * | 2/2006 | Maw | G06F 3/0483 715/793 |
| 2006/0070007 A1 * | 3/2006 | Cummins | G06F 16/2428 715/769 |

(56) References Cited

U.S. PATENT DOCUMENTS

| | | | |
|---|---|---|---|
| 2006/0085760 A1* | 4/2006 | Anderson | G06F 3/0481 715/778 |
| 2006/0087680 A1* | 4/2006 | Maeda | 358/1.15 |
| 2006/0150104 A1* | 7/2006 | Lira | G06F 3/048 715/733 |
| 2006/0212819 A1* | 9/2006 | Tobioka | 715/764 |
| 2006/0229802 A1* | 10/2006 | Vertelney | G01C 21/36 701/532 |
| 2006/0248404 A1* | 11/2006 | Lindsay | G06F 3/0481 714/38.14 |
| 2007/0016872 A1* | 1/2007 | Cummins | G06F 3/0482 715/769 |
| 2007/0050726 A1* | 3/2007 | Wakai et al. | 715/769 |
| 2007/0053308 A1* | 3/2007 | DuMas | H04L 45/00 370/254 |
| 2007/0064682 A1* | 3/2007 | Adams | H04L 29/06027 370/352 |
| 2007/0120832 A1* | 5/2007 | Saarinen | G06F 3/0485 345/173 |
| 2007/0128899 A1* | 6/2007 | Mayer | G06F 9/4406 439/152 |
| 2007/0130113 A1* | 6/2007 | Ting | G06F 16/248 |
| 2007/0143696 A1* | 6/2007 | McComber | 715/764 |
| 2007/0150834 A1* | 6/2007 | Muller | G06F 3/0486 715/810 |
| 2007/0157125 A1* | 7/2007 | Peters | G06F 3/0482 715/837 |
| 2007/0168266 A1* | 7/2007 | Questembert | G06Q 40/00 705/35 |
| 2007/0179883 A1* | 8/2007 | Questembert | G07F 19/00 705/39 |
| 2007/0200914 A1* | 8/2007 | DuMas | G08B 13/19645 348/14.01 |
| 2007/0203804 A1* | 8/2007 | Kargman | G06Q 30/0603 705/26.81 |
| 2007/0282848 A1 | 12/2007 | Kiilerich et al. | |
| 2007/0288860 A1* | 12/2007 | Ording | G06F 3/04842 715/779 |
| 2008/0010585 A1* | 1/2008 | Schneider | H04N 21/234318 715/201 |
| 2008/0034318 A1 | 2/2008 | Louch et al. | |
| 2008/0177994 A1* | 7/2008 | Mayer | G06F 9/4418 713/2 |
| 2008/0229197 A1* | 9/2008 | Branson et al. | 715/705 |
| 2008/0235610 A1* | 9/2008 | Dettinger | G06F 3/0486 715/769 |
| 2010/0017734 A1* | 1/2010 | Cummins | G06F 3/04817 715/769 |
| 2010/0070900 A1* | 3/2010 | Cummins | G06F 16/2428 715/769 |
| 2010/0161091 A1* | 6/2010 | Takatsuka | 700/94 |
| 2010/0257482 A1* | 10/2010 | Lyons | G06F 3/0486 715/794 |
| 2010/0269043 A1* | 10/2010 | Elliott | G06F 9/4443 715/716 |
| 2010/0313156 A1* | 12/2010 | Louch | G06F 3/0481 715/769 |
| 2011/0029604 A1* | 2/2011 | Bell et al. | 709/203 |
| 2012/0066632 A1* | 3/2012 | Sundermeyer | G08B 25/003 715/771 |
| 2013/0139104 A1* | 5/2013 | Singh | G06F 3/0481 715/798 |
| 2013/0159905 A1* | 6/2013 | Tokkonen | G06F 3/038 715/769 |
| 2013/0335339 A1* | 12/2013 | Maunder | 345/173 |
| 2014/0132782 A1* | 5/2014 | Tomat | H04N 1/00503 348/207.1 |

OTHER PUBLICATIONS

Ray et al. (a book SAMS Teach Yourself Mac OS X Tiger All in One; dated Jun. 1, 2005; attaches is the sample chapters of the book as in http://www.informit.com/articles/printerfriendly/390834; accessed on May 4, 2018; pub date: Jun. 3, 2005; however, the whole book is used as the prior art).*

Apple Computer, Inc., Registering Schemas, pp. 50-68, Mar. 8, 2006.

Apple Computer, Inc., Sync Services Programming Guide, pp. 1-49, Mar. 8, 2006.

Apple Computer, Inc., Sync Services Tutorial, pp. 1-26, Jul. 7, 2005.

"U.S. Appl. No. 11/499,006, Applicant's Summary of Examiner Interview filed Aug. 11, 2010", 1 pg.

"U.S. Appl. No. 11/499,006, Examiner interview Summary dated Jul. 15, 2010", 3 pgs.

"U.S. Appl. No. 11/499,006, Final Office Action dated Apr. 27, 2009", 10 pgs.

"U.S. Appl. No. 11/499,006, Final Office Action dated Apr. 27, 2010", 10 pgs.

"U.S. Appl. No. 11/499,006, Non Final Office Action dated Oct. 13, 2009", 10 pgs.

"U.S. Appl. No. 11/499,006, Non Final Office Action dated Oct. 27, 2008", 11 pgs.

"U.S. Appl. No. 11/499,006, Notice of Allowance dated Apr. 6, 2011", 12 pgs.

"U.S. Appl. No. 11/499,006, Response filed Jan. 13, 2010 to Non Final Office Action dated Oct. 13, 2009", 12 pgs.

"U.S. Appl. No. 11/499,006, Response filed Jan. 27, 2009 to Non Final Office Action dated Oct. 27, 2008", 13 pgs.

"U.S. Appl. No. 11/499,006, Response filed Jul. 23, 2010 to Final Office Action dated Apr. 27, 2010", 12 pgs.

"U.S. Appl. No. 11/499,006, Response filed Jul. 27, 2009 to Final Office Action dated Apr. 27, 2009", 14 pgs.

"U.S. Appl. No. 11/499,006, Response filed Aug. 22, 2008 to Restriction Requirement dated Jul. 22, 2008", 14 pgs.

"U.S. Appl. No. 11/499,006, Restriction Requirement dated Jul. 22, 2008", 5 pgs.

"U.S. Appl. No. 11/499,006, Supplemental Amendment filed Jan. 30, 2009", 7 pgs.

* cited by examiner

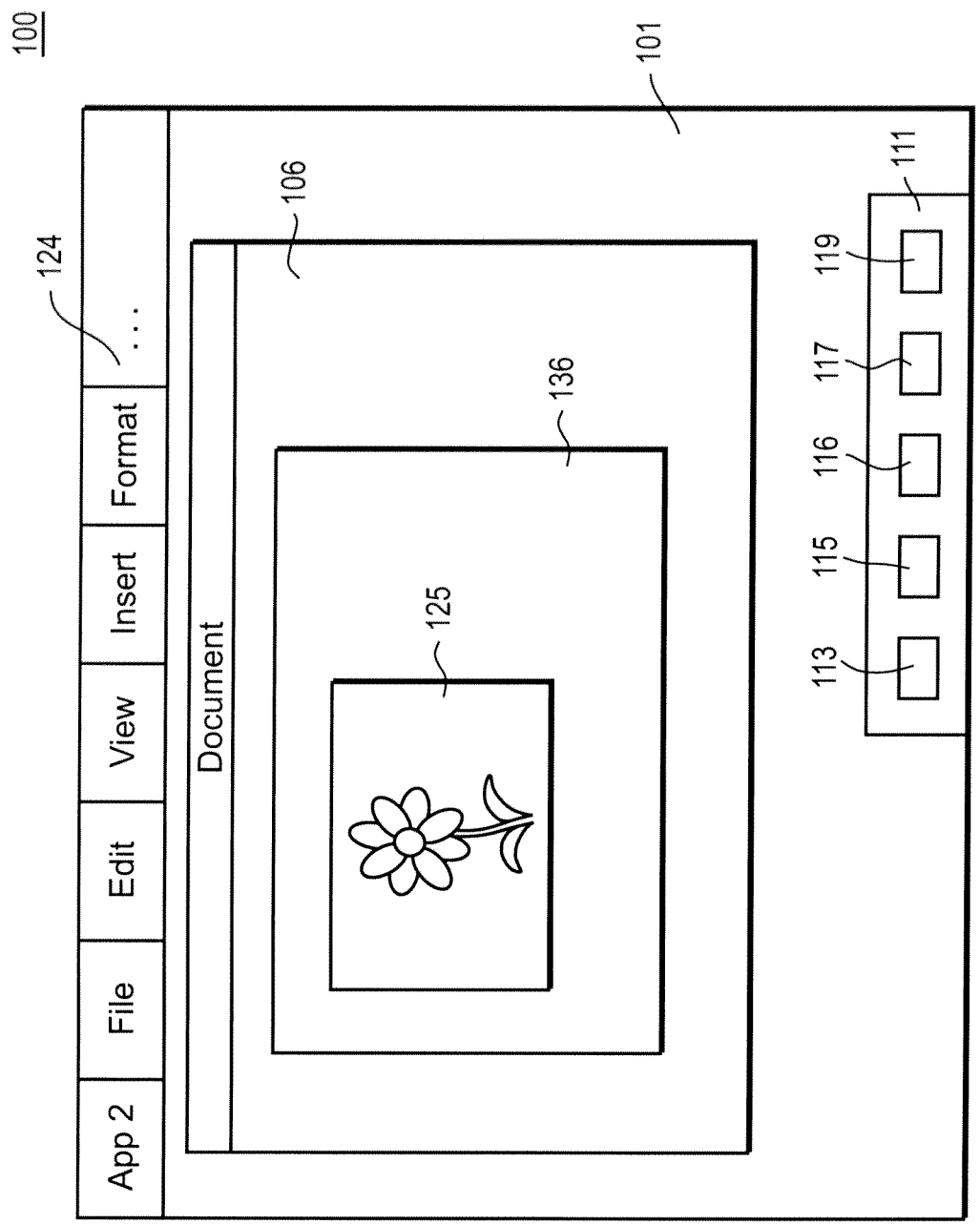

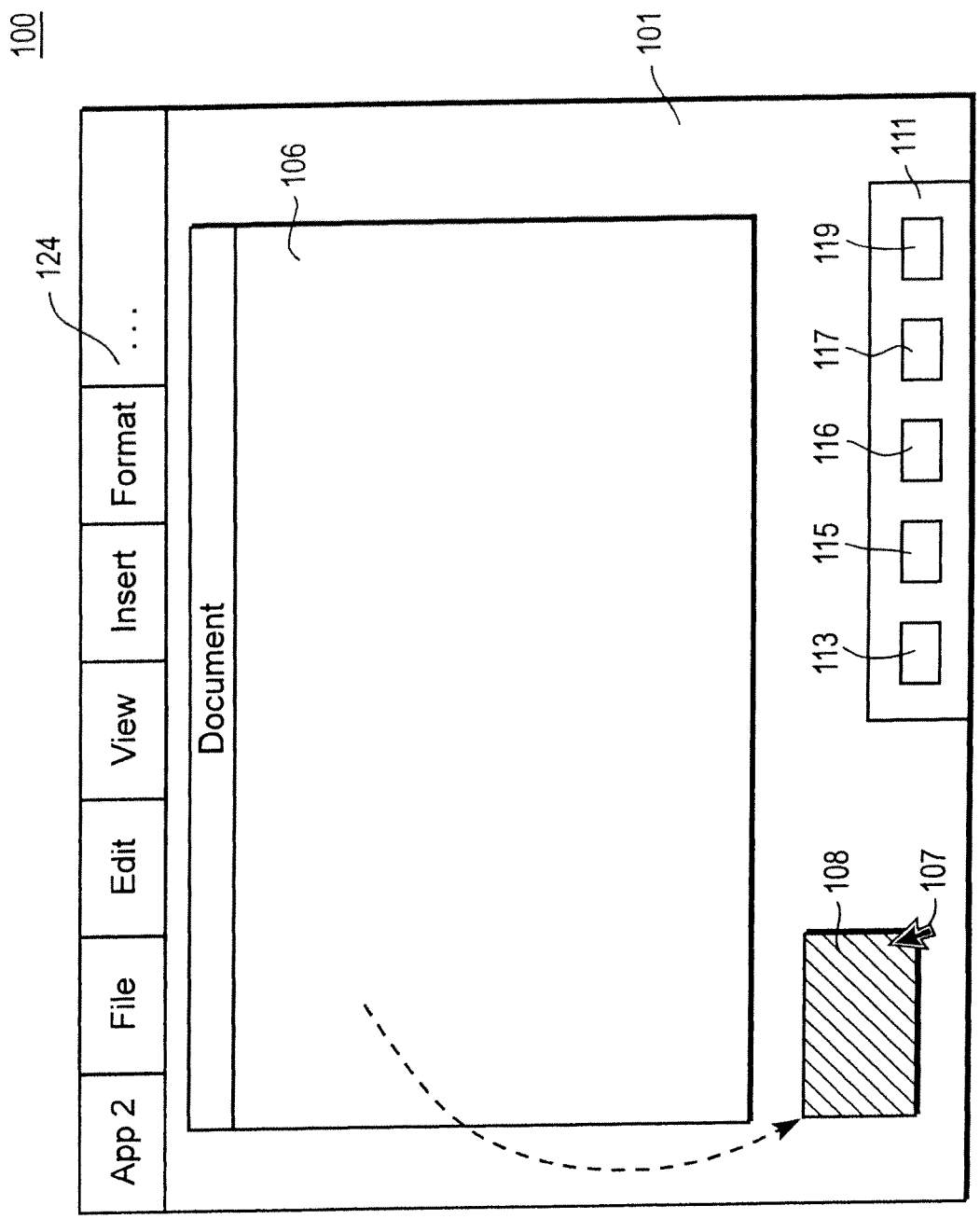

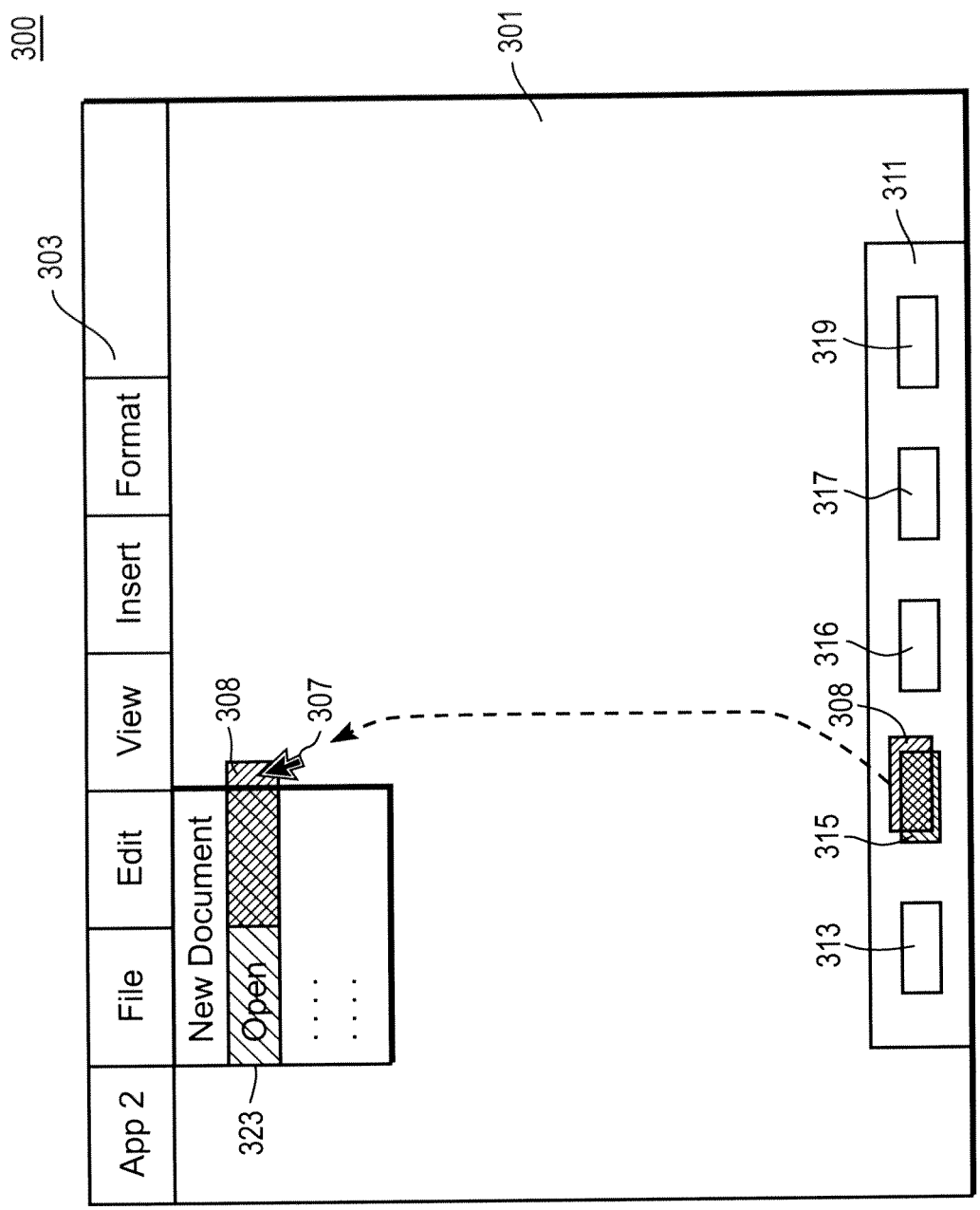

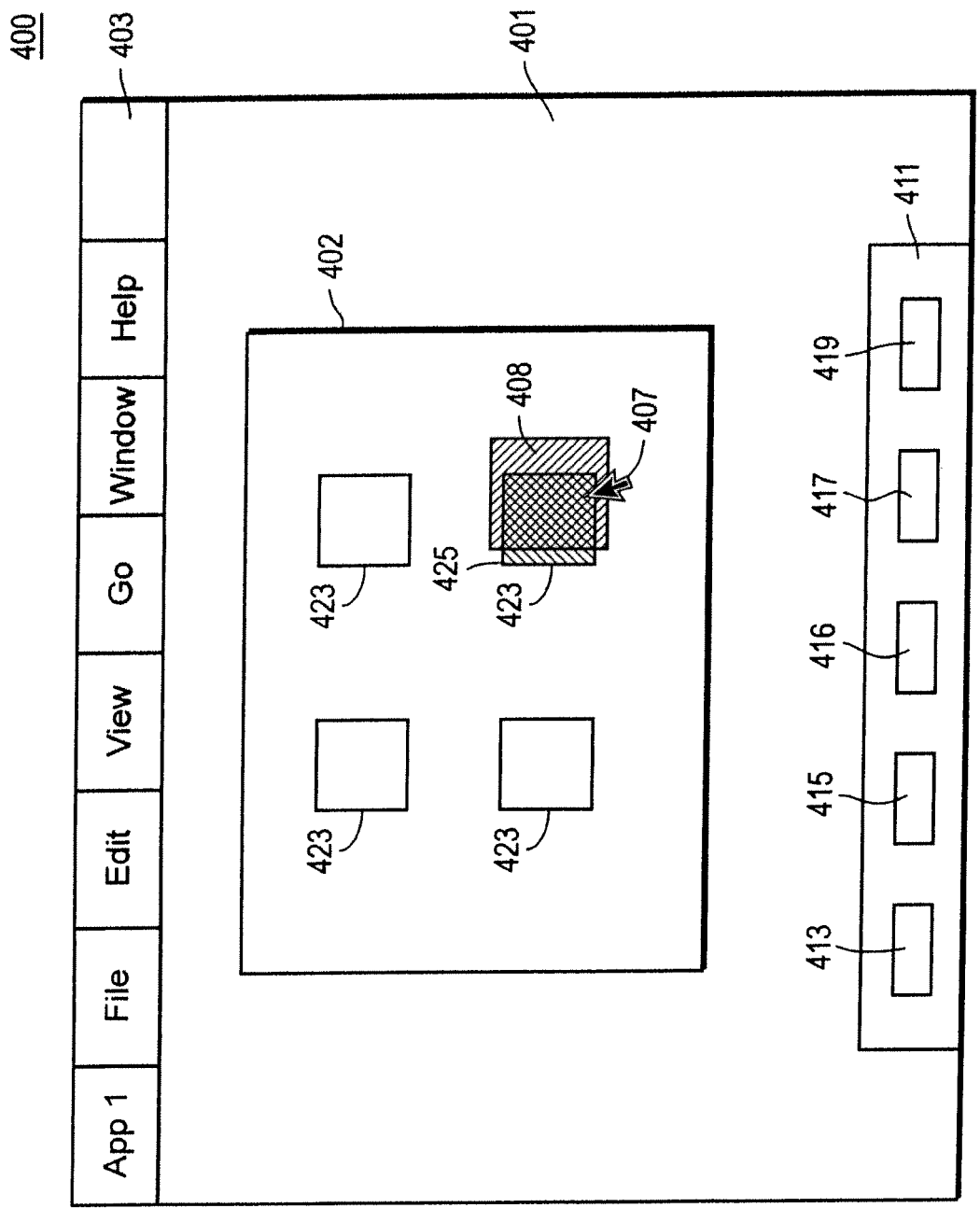

METHODS AND APPARATUSES TO CONTROL APPLICATION PROGRAMS

This application is a divisional of U.S. application Ser. No. 11/499,006 filed on Aug. 4, 2006 now U.S. Pat. No. 7,996,789.

FIELD

Embodiments of the invention relate to graphical user interfaces ("GUIs"). More particularly, embodiments of the invention relate to controlling application programs.

BACKGROUND

Data processing systems, e.g., desktop computers, laptop computers, personal digital assistants, and the like, use display devices (e.g., computer monitors) to show still and moving images on a screen. Graphical user interfaces are created for a user to interact with a data processing system using various images, e.g., icons, windows, text characters, and other objects. Images shown on a screen of a display device may represent programs, files, folders, or other items, e.g., an application launcher (e.g., a "dock interface"). For example, by positioning a pointer, ("cursor") to an icon and pressing a mouse button, the user executes a command, opens a file represented by the icon into a window, moves the icon around the display screen, or launches an application program. Typically, a user operates the application program executed by a processor through one or more windows displayed on the screen of the display device.

The docking interface ("Dock" such as the dock displayed on Macintosh computers which run Macintosh OS 10.2 or 10.3 or 10.4, etc.) is a graphical user interface that contains icons for frequently used programs. The Dock may indicate the program's current state (e.g., running or not running). The Dock may indicate the current state of the program by showing a symbol, e.g., an ellipsis, or triangle, below or adjacent its icon if the program is not running and nothing if it is currently running.

Typically, positioning a cursor over the icon in the Dock that represents non-operating application program and pressing the mouse button causes the non-operating application to launch. Typically, positioning the cursor over the icon in the Dock that represents an executing application program and pressing the mouse button brings the executing application program to the front of the screen.

As the performance of data processing systems increases, efficient use of the screen space of the display device becomes important. This is especially important for data processing systems having relatively small screens, e.g., laptop computers and personal digital assistants (PDAs).

SUMMARY OF THE DESCRIPTION

Methods and apparatuses for controlling application programs are described. In one embodiment, a first item and a dock interface having a second item are displayed on a screen space. A selection of the first item received. A proxy of the first item is positioned over the second item. Next, a window is displayed in response to the positioning. An application is executed to display the window.

In at least certain embodiments, a user may drag an icon (e.g., dragging a file's icon) onto an icon of an application program displayed on the dock and, if the application program is not already executing, the drag which cause the application program to be launched and at this point, the user may continue the drag by, for example, positioning the icon over a displayed command interface (e.g., a button or menu item or tab item) of the launched application program and cause the command, represented by the displayed command interface, to be executed by the positioning of the icon, while still continuing the drag, over the displayed command interface.

In another embodiment, synchronizing a first docking interface on a first screen space of a first machine to a second docking interface on a second screen space of a second machine is performed. The first docking interface has an item that identifies a first application supported by the first machine and the second docking interface has another item that identifies a second application supported by the second machine.

BRIEF DESCRIPTION OF THE DRAWINGS

The present invention is illustrated by way of example and not limitation in the figures of the accompanying drawings in which like references indicate similar elements.

FIG. 1E shows a view similar to FIG. 1D, after the proxy positioned into the document window is released;

FIG. 1F shows a view similar to FIG. 1D, after the proxy is positioned outside the application window;

FIG. 3A shows another embodiment of a screen space of a display device of a data processing system to control application programs;

FIG. 4B shows a view similar to FIG. 4A, after an application window is opened to display items that represent content of a folder;

DETAILED DESCRIPTION

The subject invention will be described with references to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "one embodiment", "another embodiment", or "an embodiment" means that a particular feature, structure, or characteristic described in connection with the embodiment s included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2006.

Methods and apparatuses for controlling application programs on a screen space of a display device in a data processing system that include dock syncing and dock springing and a system having a computer readable medium containing a program code for controlling application programs on a screen space of a display device that include dock syncing and dock springing are described below. Other methods and other features are also described.

Figure 1A:
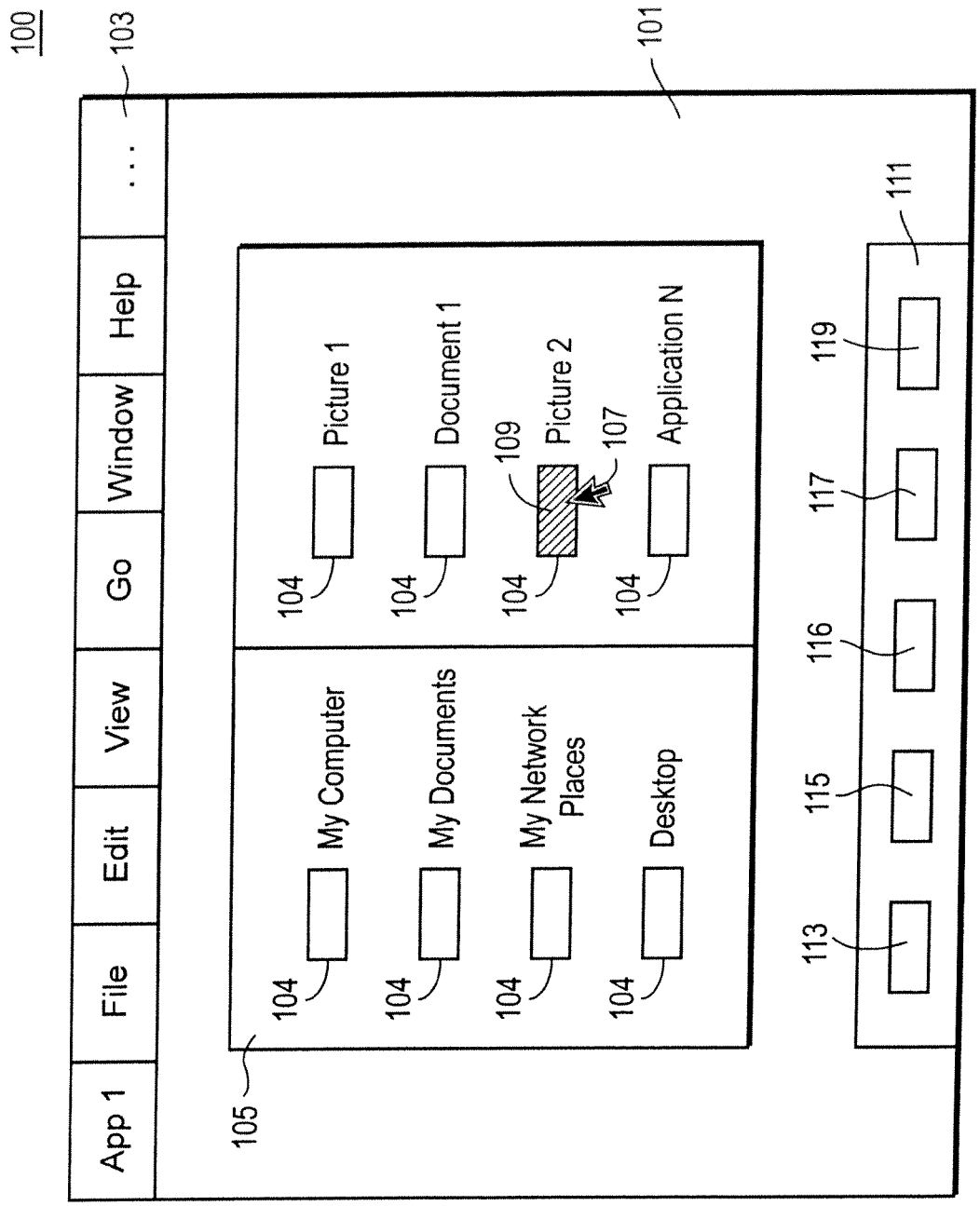
FIG. 1A shows one embodiment of a screen space of a display device of a data processing system, wherein a portion of the screen space includes a displayed region (e.g., a "dock") which is used to control application programs.

FIG. 1A shows one embodiment of a screen space of a display device of a data processing system to control application programs that involves dock springing. As shown in FIG. 1A, a screen space 101 displays a menu 103, a docking interface 111, and an application window 105. Menu 103 displays identifiers for actions that can be performed when the application program App. 1 is executed, such as "Edit", "View", "File", and the like. Application program window 105 for App. 1 includes one or more items 104 that represent application programs, files, and folders, as shown in FIG. 1A. Typically, the application window is an enclosed, rectangular area on the screen space which can be moved around the screen and can be caused to appear and to be removed by a command from the user. Within different windows, a user can run different programs or display different data. Typically, an application receives a user input through the application window.

An application window may have a variety of characteristics or features including one or more of the following: (a) a moveable and resizable container having borders; (b) scroll controls, such as scroll arrows, to scroll the contents of the window; (c) the window can receive user input such as text entry (e.g. through typing or copying and pasting of text) or cursor entry events (e.g. selection of buttons or commands within a window) or dragging and dropping of an object.

Dock interface 111 can include one or more items representing application programs, e.g., user level applications and system level applications, folders, URLs, and the like. Generally, a dock may be considered a displayed region, on a display device, which includes icons of application programs and possibly icons of user created folders or files, and the like, and those application programs can be launched (or if already executing, have their windows brought to the foreground) by selecting the icon on the dock for one of those application programs. Another example of such a displayed region is the toolbar (or task bar) typically displayed at the bottom of a screen space in a Microsoft Windows operating system (e.g., Windows XP). Yet another example of such a displayed region is a dashboard that may contain such application programs to provide weather information, traffic information, and other useful information. As shown in FIG. 1A, dock interface 111 includes items 113, 115, 116, 117, and 119. For example, item 113 represents an application program 1 ("App. 1), item 115 represents an application program 2 ("App. 2"), item 116 represents an application 3 ("App. 3"), item 117 represents an URL, and item 119 represents a folder. Application programs may be, for example, Word®, Outlook®, Acrobat®, Photoshop®, Finder®, Explorer®, or any other application programs known to one of ordinary skill in the art of data processing systems. In one embodiment, items 113, 115, 116, 117, 119 are images, e.g., icons, texts, symbols, or any combination thereof. Any content, e.g., applications, folders, URLs that is represented by an item displayed the dock interface 111 can be "sprung". For example, springing of an executing application program causes the application program to appear on the front of screen space 101. For example, springing of the application that is not currently executed causes launching the application. Springing of the content of the dock can be performed by selecting one of the items displayed on the docking interface 111, e.g., by positioning a cursor over the item and pressing or double-pressing a mouse button, or by any other method known to one of ordinary skill in the art of data processing systems.

As shown in FIG. 1A, one of items 104 is selected to become a selected item 109. For example, selected item 109 may represent a file containing a picture, a document, a flowchart presentation, or any other file. In one embodiment, selection of item 109 is performed by positioning cursor 107 over one of items 104. In another embodiment, a user performs selection of item 109 by positioning a cursor 107 over one of items 104 and then pressing a button of a mouse ("clicking"). In an embodiment, a selection of one or more items 104 may be performed by using an audio signal, voice, striking and holding of one or more keys on a keyboard, or by any other mechanisms known to one of ordinary skill in the art of data processing systems. In one embodiment, the selected item 109 has a proxy that can be moved over screen space 101. In one embodiment, the proxy can be created by positioning a cursor over one or the items 104 and pressing the mouse. In another embodiment, the proxy can be created using any other methods known to one of ordinary skill in the art of data processing systems. In one embodiment, an item that is positioned on a desktop of a screen space 101 outside window 405 is selected.

Figure 9:
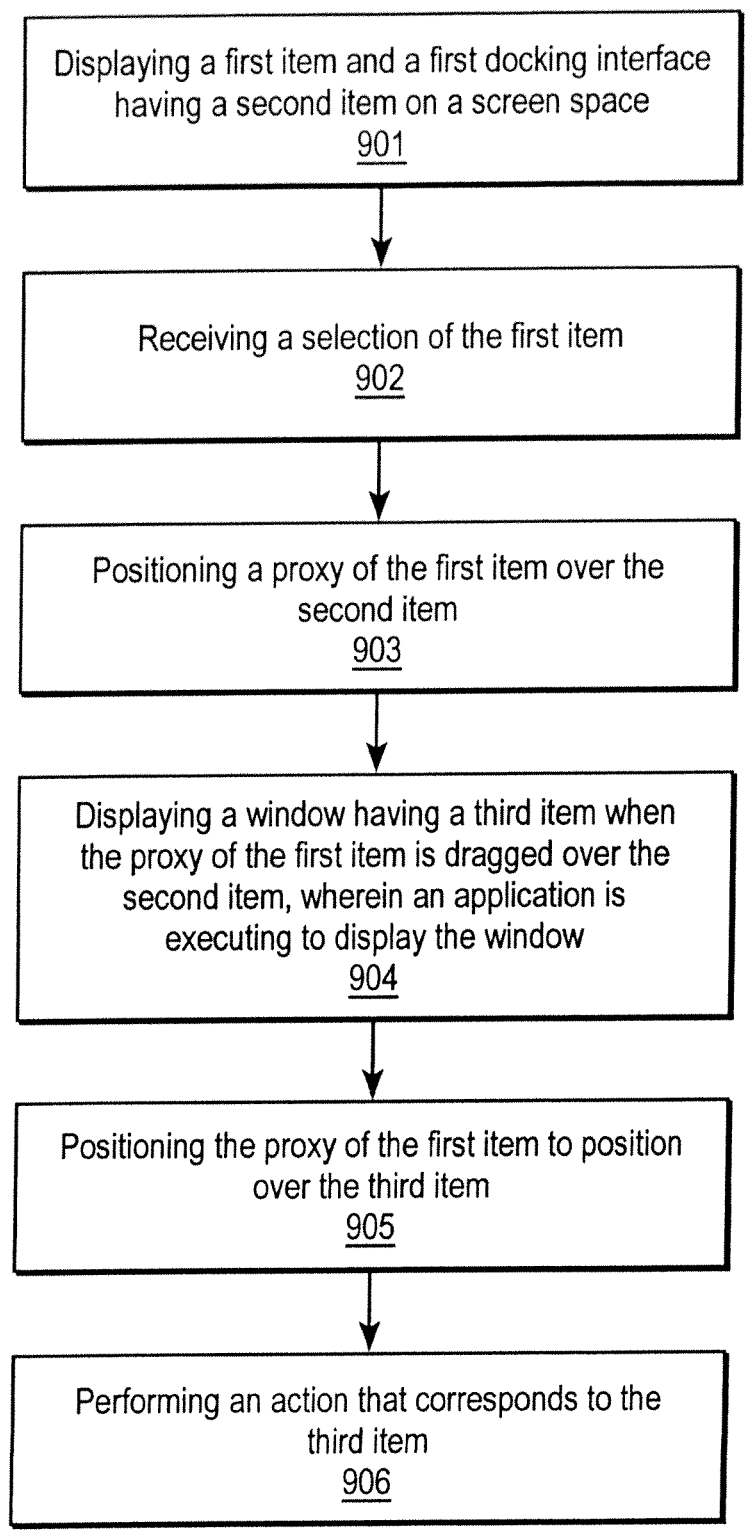
FIG. 9 shows one embodiment of a flowchart of a method to control application programs.

FIG. 9 shows one embodiment of a flowchart of a method to control application programs. Method 900 begins with operation 901 that involves displaying a first item and a docking interface having a second item on a screen space, as described above. Method 900 continues with operation 902 that involves receiving a selection of the first item to create a proxy, as described above. Next, operation 903 is performed that involves positioning the proxy of the first item over (e.g., adjacent to) the second item.

Figure 1B:
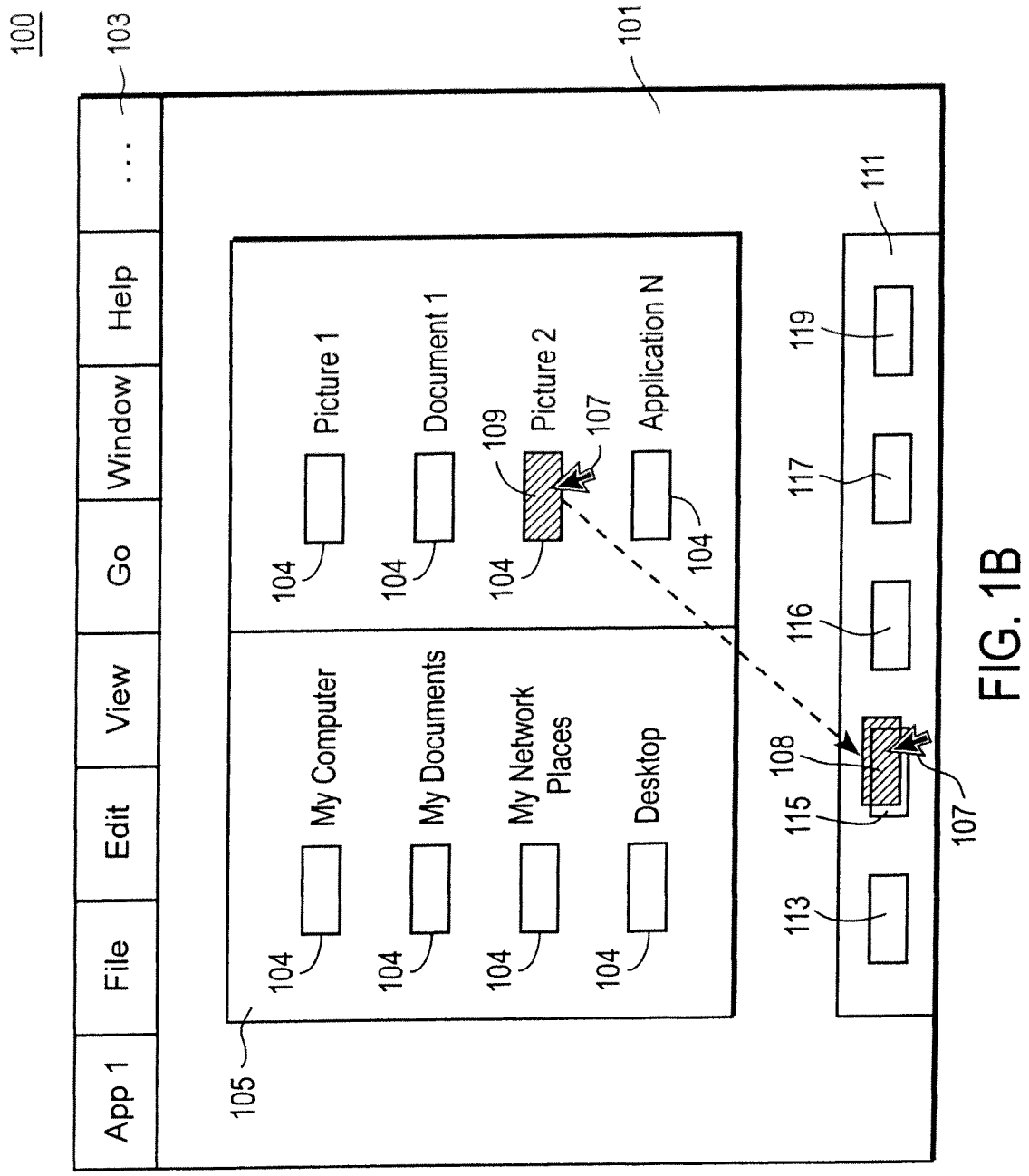
FIG. 1B shows a view similar to FIG. 1A, after positioning a proxy of the selected item over an item within the displayed region.

FIG. 1B shows a view similar to FIG. 1A, after positioning proxy 108 of the selected item 109 over item 115. As shown in FIG. 1B, item 115 that represents App. 2 is displayed in Dock 111. In one embodiment, proxy 108 is positioned over item 115 by dragging using cursor 107. For an embodiment, proxy 108 may be positioned over item 115 using, e.g., a voice command, a keypad, or any other methods known to one of ordinary skill in the art of data processing systems. For another embodiment, proxy 108 is positioned at a predetermined distance from item 115. The predetermined distance may be, for example, in the approximate range of 0 to 5 millimeters ("mm") from item 115.

Referring back to FIG. 9, method 900 continues with operation 904 that involves displaying a window having a third item when a proxy of the first item is positioned over the second item, wherein an application is executing to display the window, as described below. In one embodiment, operation 904 of displaying the window involves launching the application if the application was not executing. In another embodiment, operation 904 of displaying the window involves bringing the window of the executing application, as described in further detail below. In one embodiment, an operation (not shown) is performed that involves determining whether a predetermined amount of time of positioning the proxy of the first item over the second item has expired. If the predetermined time has expired, the application window is automatically displayed. If the predetermined time has not yet expired, the application window is not displayed. In one embodiment, the predetermined amount of time is set by the user.

Figure 1C:
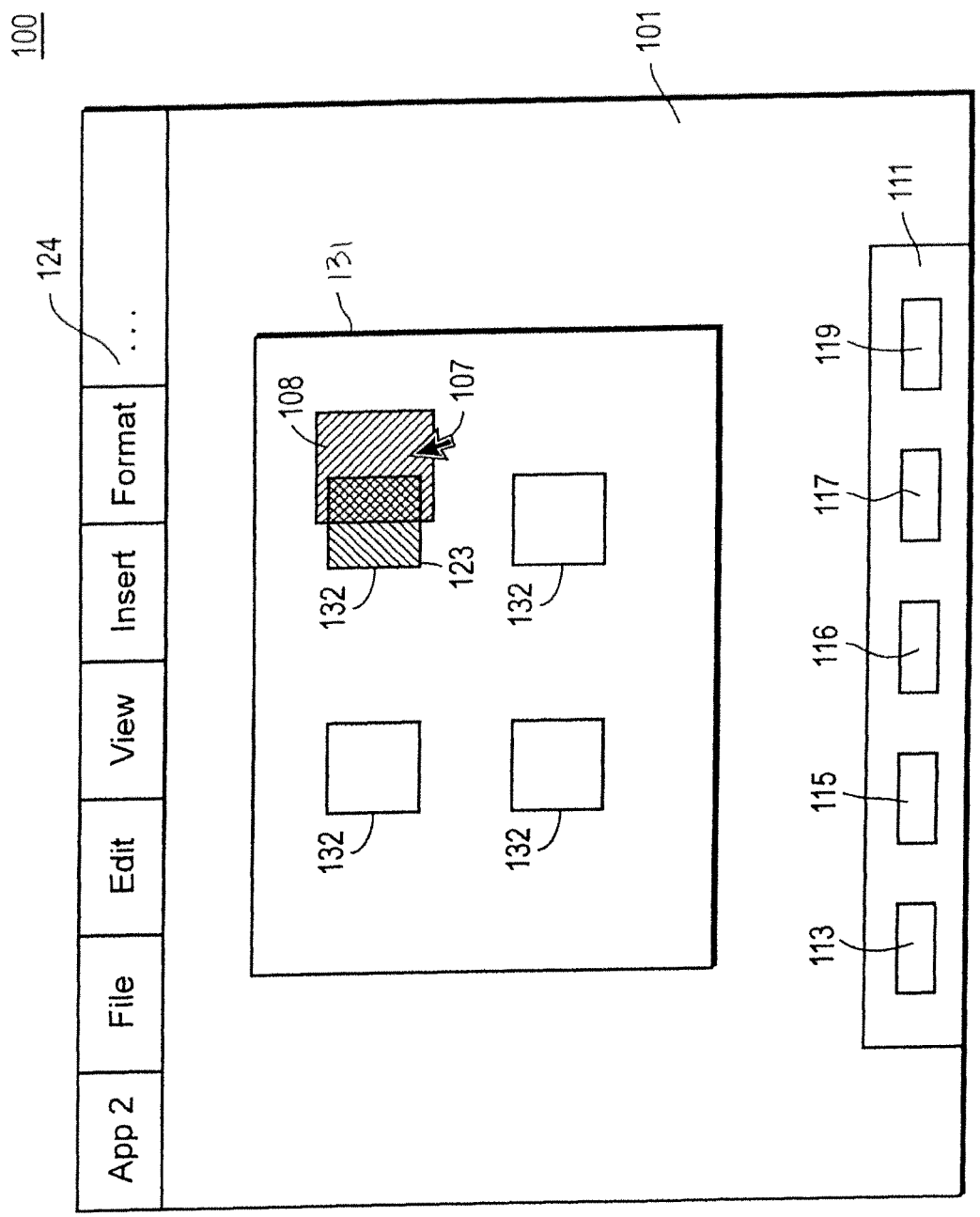
FIG. 1C shows a view similar to FIG. 1B, after a window of an application is displayed in response to positioning the proxy 108 over the item within the displayed region.

FIG. 1C shows a view similar to FIG. 1B, after a window 131 of App. 2 is displayed in response to positioning proxy 108 over item 115. App. 2 is executing to display window 131. In one embodiment, displaying window 131 involves launching of the App. 2. In another embodiment, displaying window 131 involves bringing the App. 2 to the front of the screen space, as described in further detail below with respect to FIG. 2.

In one embodiment, window 131 of App. 2 is displayed after determining whether a predetermined amount of time of positioning proxy 108 over item 115 has expired. If the predetermined time has expired, the application window 131 is automatically displayed. If the predetermined time has not yet expired, the application window 131 is not displayed. In one embodiment, the predetermined amount of time is set by the user, and can be in the approximate range of 0-20 seconds.

In one embodiment, positioning of proxy 108 over item 115 includes collecting a first information that is represented by proxy 108 and a second information that is represented by item 115 and then comparing these two informations. If the first information is not compatible with the second information, positioning of proxy 108 over item 115 does not cause displaying window 131. For example, if a type of the file represented by proxy 108 is not compatible with an application represented by item 115, positioning of proxy 108 over item 115 does not cause displaying window 131.

As shown in FIG. 1C, a menu 124 that contains one or more items representing functions that can be performed by App. 2 is displayed on screen space 101. Window 131 contains one or more items 132. Each of the items 132 represents an action that can be performed by App. 2. In one embodiment, items 132 represent a default action that can be performed by App. 2. For example, items 132 can represent an action to open a new document, open an existing document, saving a document, and any other action depending on the program application. For one embodiment, items 132 may represent controls of the data processing system. As shown in FIG. 1C, one of items 132 is selected to become a selected item 123. For example, selected item 123 can represent a command to open anew document. In one embodiment, a user performs selection by continuing to position a proxy 108 over one of items 132 to create a selected item 123. In another embodiment, proxy 108 is positioned at a predetermined distance from one of items 132 to create a selected item 123 In one embodiment, continuing of the positioning of proxy 108 over one of items 132 is performed by continuing to drag proxy 108 over one of items 132 to create selected item 123. In another embodiment, continuing of the positioning of the proxy 108 over one of items 132 is performed using an audio signal, voice, striking and holding of one or more keys on a keyboard, or by any other mechanisms known to one of ordinary skill in the art of data processing systems. Referring back to FIG. 9, method 900 continues with operation 905 that involves continue to positioning the proxy of the first item over the third item, as described above. Next, an action that corresponds to the third item is performed at operation 906. In one embodiment, an operation is performed (not shown) that involves determining whether a predetermined amount of time of positioning of the proxy of the first item over the third item has expired. If the predetermined time has expired, the action is automatically performed. If the predetermined time has not yet expired, the action is not performed. In one embodiment, the predetermined amount of time is set by the user.

Figure 1D:
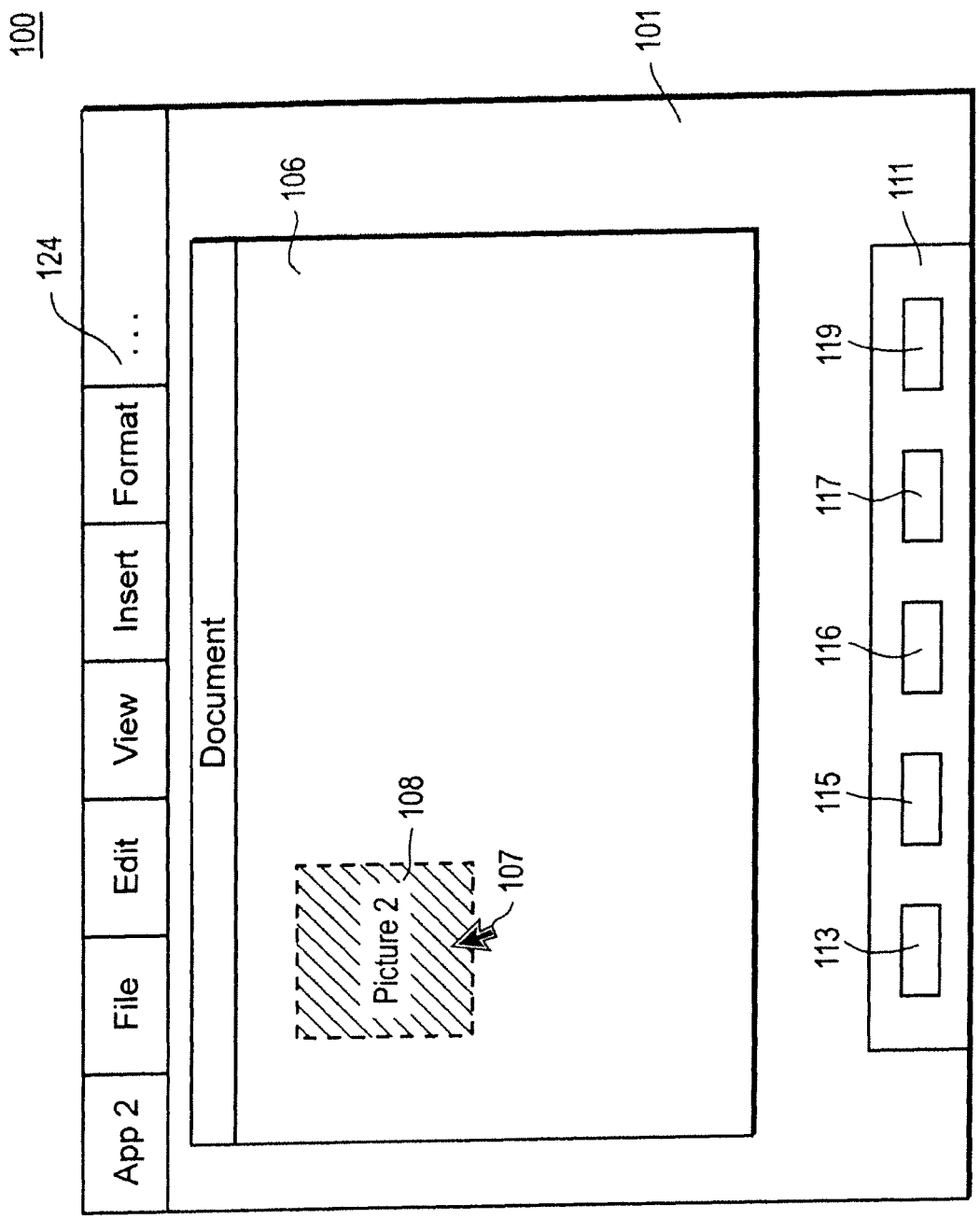
FIG. 1D shows a view similar to FIG. 1C, after displaying a new document window in response to positioning the proxy over a selected item within the application window or at a predetermined distance from the selected item.

FIG. 1D shows a view similar to FIG. 1C, after displaying a new document window 106 in response to positioning proxy 108 over selected item 123 or at a predetermined distance fro selected item 123. That is, positioning of a proxy over a visual interface, e.g., selected item 123, or at a predetermined distance from the visual interface causes actuation (springing) of this visual interface (e.g., selected item 123). In one embodiment, springing an application from dock 111, and springing (actuation) of the visual interface (e.g., menu items, buttons, and other controls) involves continuously dragging of the proxy of a selected object over a selected icon in dock 111 and over selected visual interface through the entire sequence with a single click of the mouse button.

In one embodiment, displaying new document window 106 is performed after proxy 108 is positioned over selected item 123 for a predetermined amount of time, e.g., in the approximate range of 0 to 50 seconds. In one embodiment, the predetermined amount of time is set by the user.

FIG. 1E shows a view similar to FIG. 1D, after proxy 108 of the item 109 positioned into document window 136 is released. In one embodiment, proxy 108 can be released by releasing the mouse button. For another embodiment, proxy can be released using, a voice command, a keypad, or any other methods known to one of ordinary skill in the art of data processing devices. As shown in FIG. 1E, document window 106 contains a document 136. As shown in FIG. 1E, a picture 125 is inserted into document 136.

Figure 10:
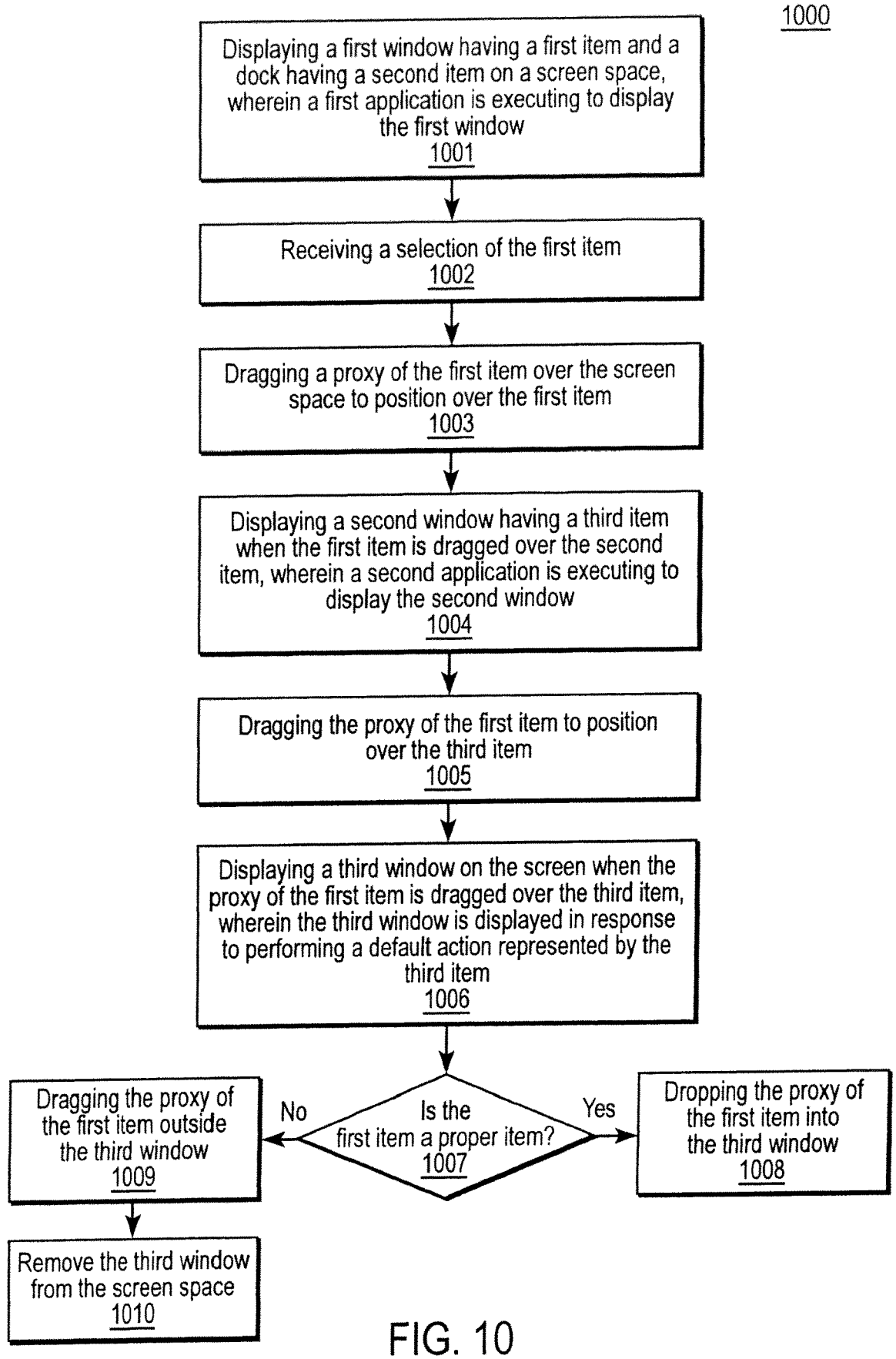
FIG. 10 shows a flowchart of another embodiment of a method to control application programs.

FIG. 10 shows a flowchart of another embodiment of a method to control application programs. Method 1000 begins with operation 1001 that involves displaying a first window having a first item and a dock having a second item on a screen space, wherein a first application is executing to display the first window. Next, a selection of the first item is received in operation 1002. Further, operation 1003 that involves dragging a proxy of the first item along the screen space to position over the second item is performed. Next, displaying a second window having a third item when the proxy of the first item is dragged over the second item is performed. A second application is executing to display the second window. Next, operation 1005 that involves dragging the proxy of the first item to position over the third item is performed. Further, operation 1006 is performed that involves displaying a third window on the screen space when the proxy of the first item is dragged over the third item. The third window is displayed in response to performing a default function represented by the third item. Operations 1001-1006 were described above. Next, a determination is made at operation 1007 whether the first item is a proper item. If the first item is a proper item, the proxy of the first item is dropped into the third window in operation 1008. If the first item is not a proper item, the proxy of the first item is positioned outside the third window. Next, the third window is removed from the screen space in operation 1010 in response to positioning the proxy of the first item outside the third window. In one embodiment, dragging of the proxy of the first item is performed continuously with a single pressing ("click") of the mouse button throughout the entire sequence of operations 1003-1008 or the entire sequence of operations 1003-1010.

FIG. 1F shows a view similar to FIG. 1D, after proxy 108 is positioned outside application window 106. In one embodiment, proxy 108 is positioned outside application window 106 by continuing to drag proxy 108 using cursor 107. In another embodiment, proxy 108 is positioned outside application window 106 using, e.g., a voice command, a keypad, or any other method known to one of ordinary skill in the art of data processing systems.

Figure 1G:
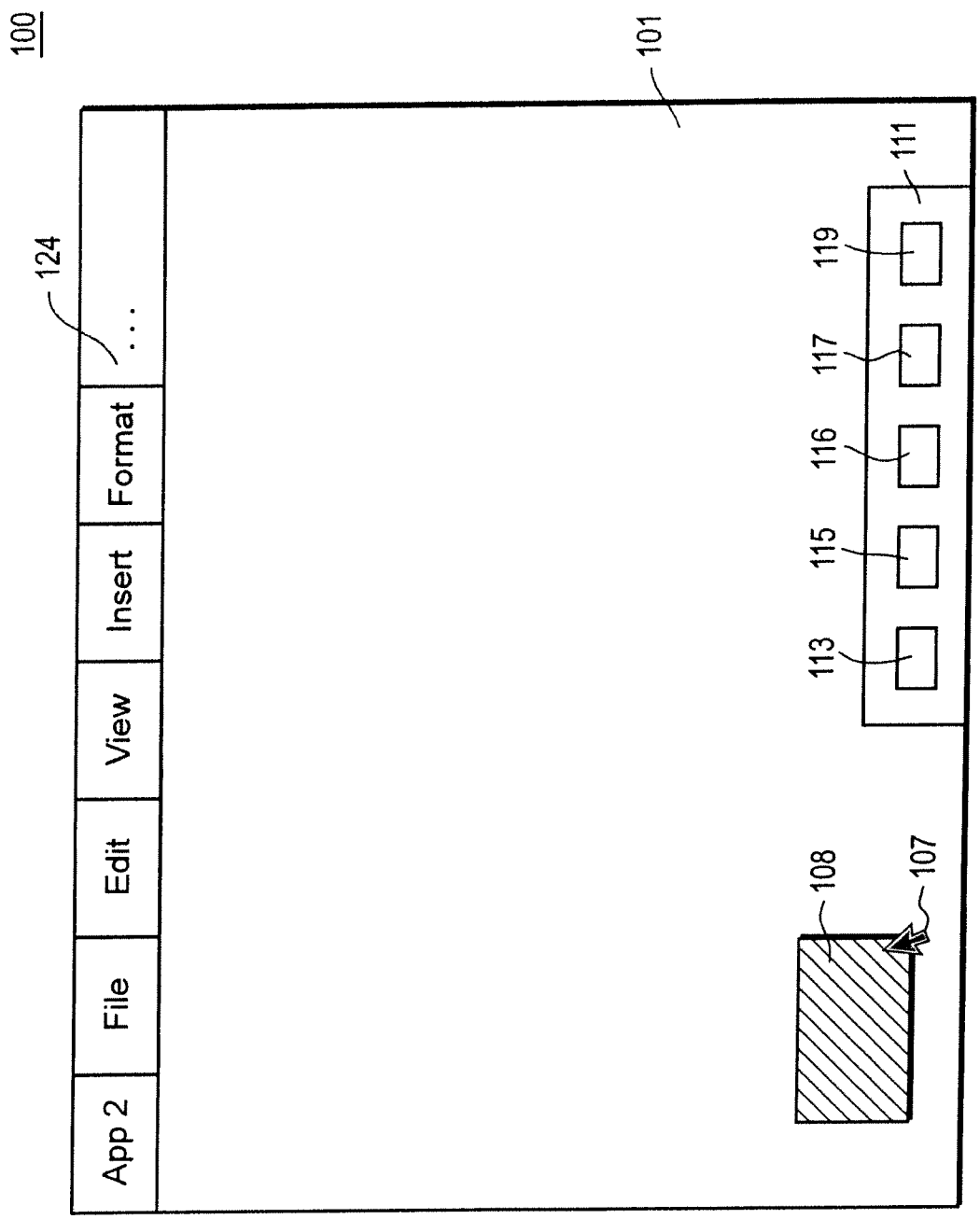
FIG. 1G shows a view similar to FIG. 1F, after the application window is automatically removed from the screen space in response to positioning of the proxy outside the application window.

FIG. 1G shows a view similar to FIG. 1F, after window 106 is automatically removed from screen space 101 in response to positioning proxy 108 outside the application window.

Figure 2A:
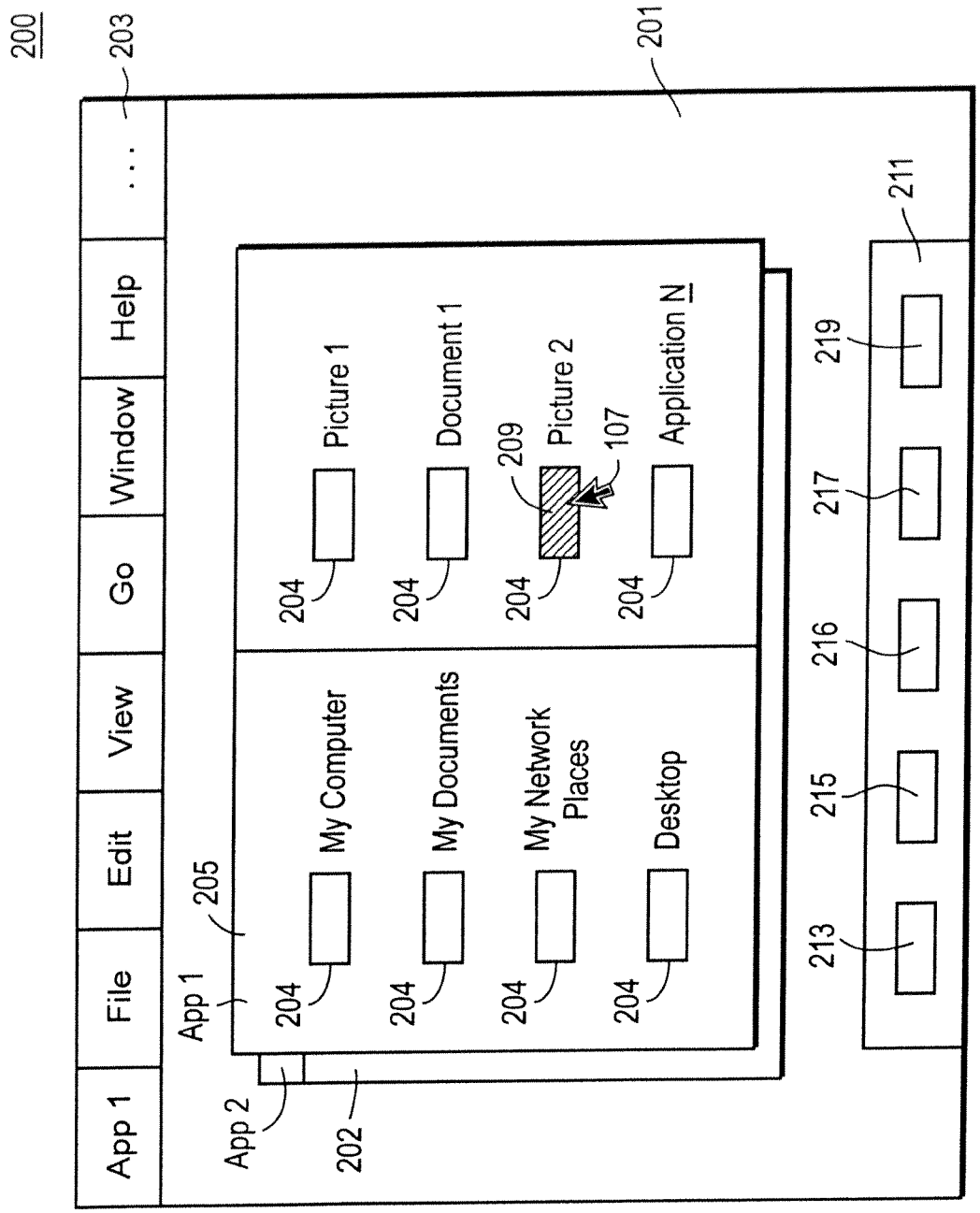
FIG. 2A shows another embodiment of a screen space of a display device of a data processing system to control application programs, wherein a portion of the screen space includes a displayed region which is used to control application programs.
Figure 2B:
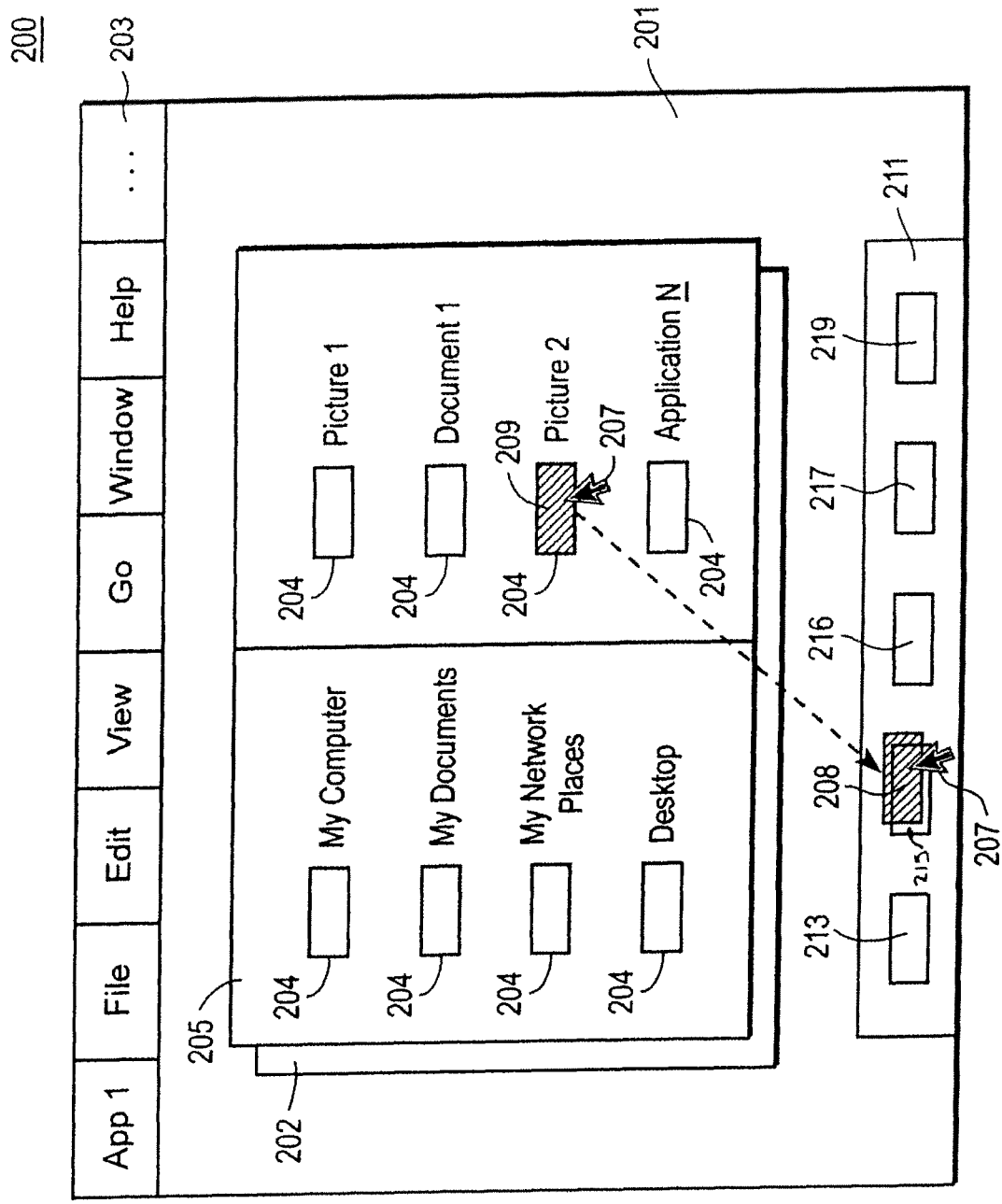
FIG. 2B shows a view similar to FIG. 2A, after positioning a proxy of a selected item over an item within the displayed region.

FIG. 2A shows another embodiment of a screen space of a display device of a data processing system to control application programs. As shown in FIG. 2A, a screen space 201 displays a menu 203, a docking interface 211, an application window of App. 1 205 on the front of the screen space 201, and a portion of an application window App. 2 on the back of the screen space 201. Menu 203 displays identifiers for actions that can be performed when the application program App. 1 is executed, such as "Edit", "View", "File", and the like. Application program window of App. 1 205 includes one or more items 204 that represent application programs, files, and folders, as shown in FIG. 2A. Docking interface 211 can include one or more items representing application programs, e.g., user level applications and system level applications, folders, URLs, and the like. As shown in FIG. 2A, docking interface 211 includes items 213, 215, 216, 217, and 219. For example, item 213 may represent an application program 1 ("App. 1"), item 215 may represent an application program 2 ("App. 2"), item 216 may represent an application 3 ("App. 3"), item 217 may represent an URL, and item 219 may represent a folder. In one embodiment, items 213, 215, 216, 217, 219 images, e.g., icons, texts, symbols, or any combination thereof. As shown in FIG. 2A, one of items 204 is selected to become a selected item 209. For example, selected item 209 may represent a file containing a picture, as shown in FIG. 2A. In one embodiment, selected item 209 has a proxy that can be moved over screen space 201. In one embodiment, selection is performed by positioning cursor 207 over one of items 204. In another embodiment, a user performs selection by positioning a cursor 207 over one of items 204 and then pressing the mouse button. In another embodiment, a selection of one of items 204 is performed by using an audio signal, voice, striking and holding of one or more keys on a keyboard, or by any other mechanisms known to one of ordinary skill in the art of data processing systems. FIG. 2B shows a view similar to FIG. 2A, after positioning proxy 208 of selected item 209 over item 215. As shown in FIG. 1B, item 215 that represents executing application program App. 2 is displayed in Dock 211. As shown in FIG. 2B, an application window 202 of executing operation App. 2 is hidden behind application window 205 of executing operation App. 1. In one embodiment, proxy 208 is positioned over item 215 by dragging proxy 208 over screen space 201 using cursor 207, as shown in FIG. 2B. In an embodiment, proxy 208 may be positioned over item 215 using, e.g., a voice command, a keypad, or any other methods known to one of ordinary skill in the art For another embodiment, proxy 208 is positioned at a predetermined distance from item 215. The predetermined distance may be, for example, in the approximate range of 0 to 5 millimeters ("mm") from item 215.

Figure 2C:
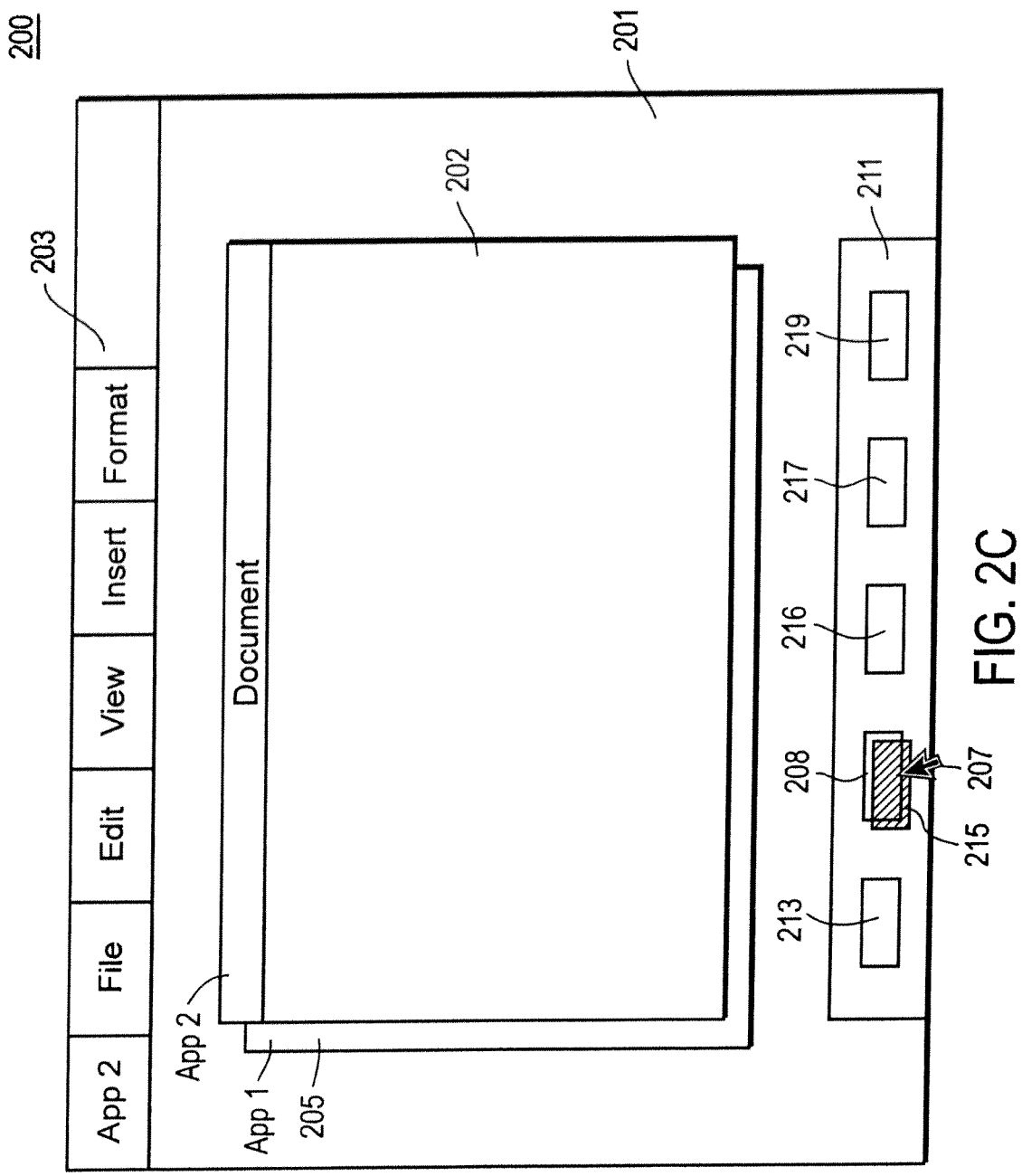
FIG. 2C shows a view similar to FIG. 2B, after an application window is displayed in response to positioning the proxy over or at a predetermined distance from the item within the displayed region.

FIG. 2C shows a view similar to FIG. 2B, after application window 202 of App. 2 is displayed in response to positioning proxy 208 over item 215 or at a predetermined distance from selected item 215. App. 2 is executing to display window 202. As shown in FIG. 2C, window 202 is displayed by being brought to the front of screen space 201. As shown in FIG. 2C, window 205 of executing application 205 is brought to the back of screen space 201 in response to positioning proxy 208 over item 215.

In one embodiment, window 202 of App. 2 is brought to the front of screen space 201 after determining whether a predetermined amount of time of positioning proxy 208 over item 215 has expired. If the predetermined time has expired, the application window 202 is automatically brought to the front of screen space 201. If the predetermined time has not yet expired, application window 202 is not displayed. In one embodiment, the predetermined amount of time is set by the user, and can be in the approximate range of 0-20 seconds.

As shown in FIG. 2C, screen space 201 displays a menu 233 having one or more identifiers for actions that can be performed when the application program App. 2 is executed, as described above. In one embodiment, application window 202 may contains one or more items (not shown) representing a default action that can be performed by App. 2, and controls buttons of the data processing system, as described above. In one embodiment, application window 202 is a document window, as shown in FIG. 2C.

Figure 2D:
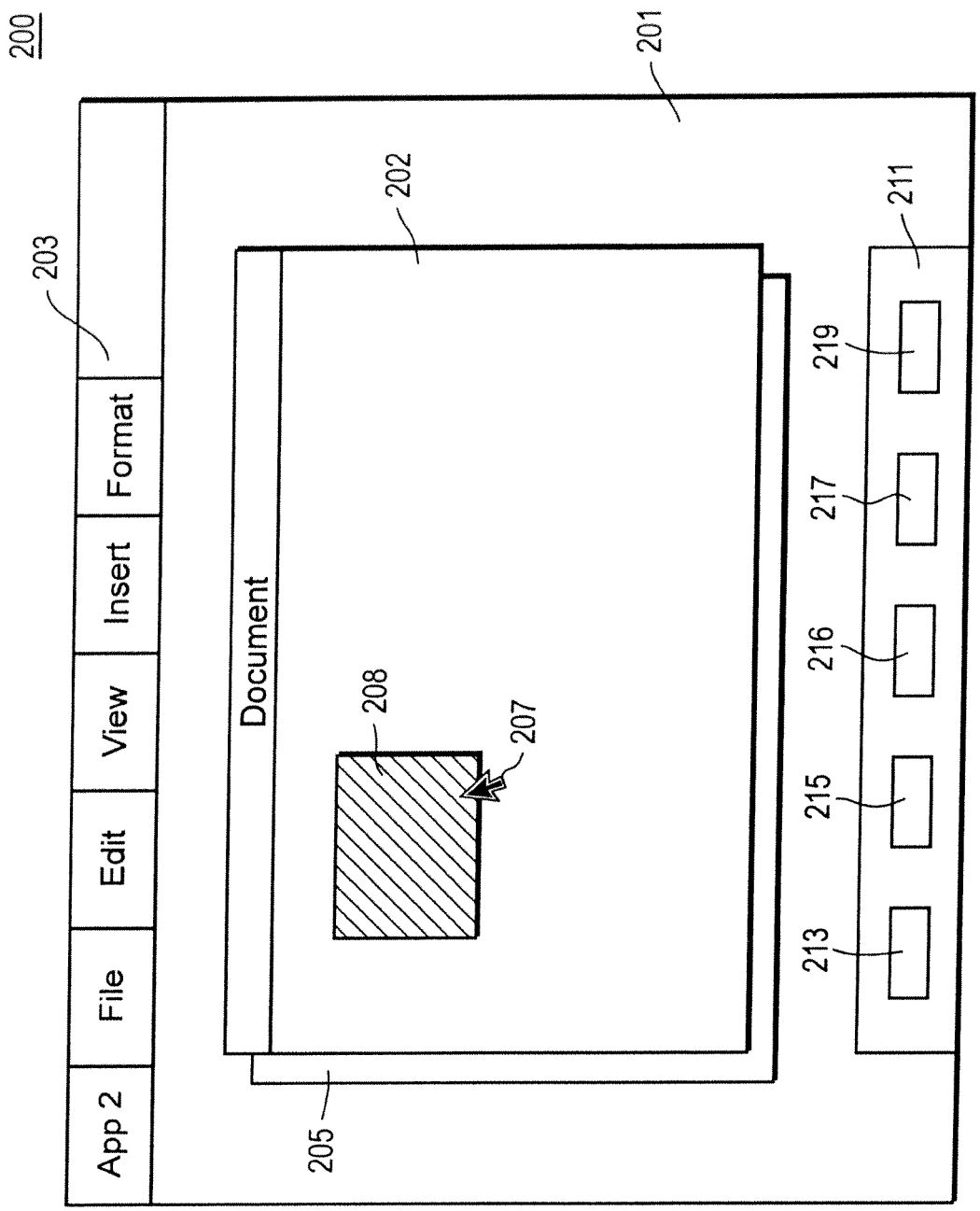
FIG. 2D shows a vie similar to FIG. 2C, after positioning the proxy into the application window.

FIG. 2D shows a view similar to FIG. 2C, after positioning proxy 208 into window 202. In one embodiment, proxy 208 is positioned into window 202 by dragging over screen space 201 using cursor 207, as shown in FIG. 2B. In an embodiment, proxy 208 may be positioned over item 215 using, e.g., a voice command, a keypad, or any other methods known to one of ordinary skill in the art. Next, proxy 208 can be released to insert a content of the file, e.g., a document, a picture, or any other content, represented by selected item 209 into window 202, as described above. In another embodiment, proxy 208 is moved out of window 202 that causes closing automatically window 202, so that a content, a document, a picture, or any other object represented by proxy 208 is not inserted into window 202, as described above. In one embodiment, dragging of proxy 208 is performed continuously with a single click of the mouse button throughout the entire sequence of operations depicted in FIGS. 2A-2D.

FIG. 3A shows another embodiment of a screen space of a display device of a data processing system to control application programs. As Shown in FIG. 3A, a screen space 301 displays a menu 303, and docking interface 311. Menu 303 displays identifiers for actions that can be performed when the application program App. 2 is executed, such as "Edit", "View", "File", and the like. Menu identifier "File" contains menu items 323, e.g., creating a new file, open an existing file, and the like. Docking interface 311 can include one or more items representing application programs, e.g., user level applications and system level applications, folders, URLs, and the like. As shown in FIG. 3A, docking interface 311 includes items 313, 315, 316, 317, and 319. For example, item 313 represents an application program 1 ("App. 1), item 315 represents an application program 2 ("App. 2"), item 316 represents an application 3 ("App. 3"), item 317 represents an URL, and item 319 represents a folder that can be opened using application N ("App. N"). In one embodiment, items 313, 315, 316, 317, 319 are images, e.g., icons, texts, symbols, or any combination thereof. A pull-down menu is displayed after positioning proxy 308 of the item selected from another application, e.g., App. 1 over item 315 representing App. 2 in dock 311, as described above with respect to FIGS. 1A-1C, and then continuously dragging proxy 308 over the menu identifier "File". In one embodiment, displaying menu 303 involves launching App. 2, as described above. The item that is represented by proxy 308 can be e.g., a file containing a flowchart. App. 2 is executing to display menu 303. As shown in FIG. 3A, proxy 308 is positioned over item 323 that represents an action of opening the file. In one embodiment, proxy 308 is positioned over item 323 by dragging using cursor 307. In an embodiment, proxy 308 may be positioned over item 323 using, e.g., a voice command, a keypad, or any other methods known to one of ordinary skill in the art of data processing devices.

Figure 3B:
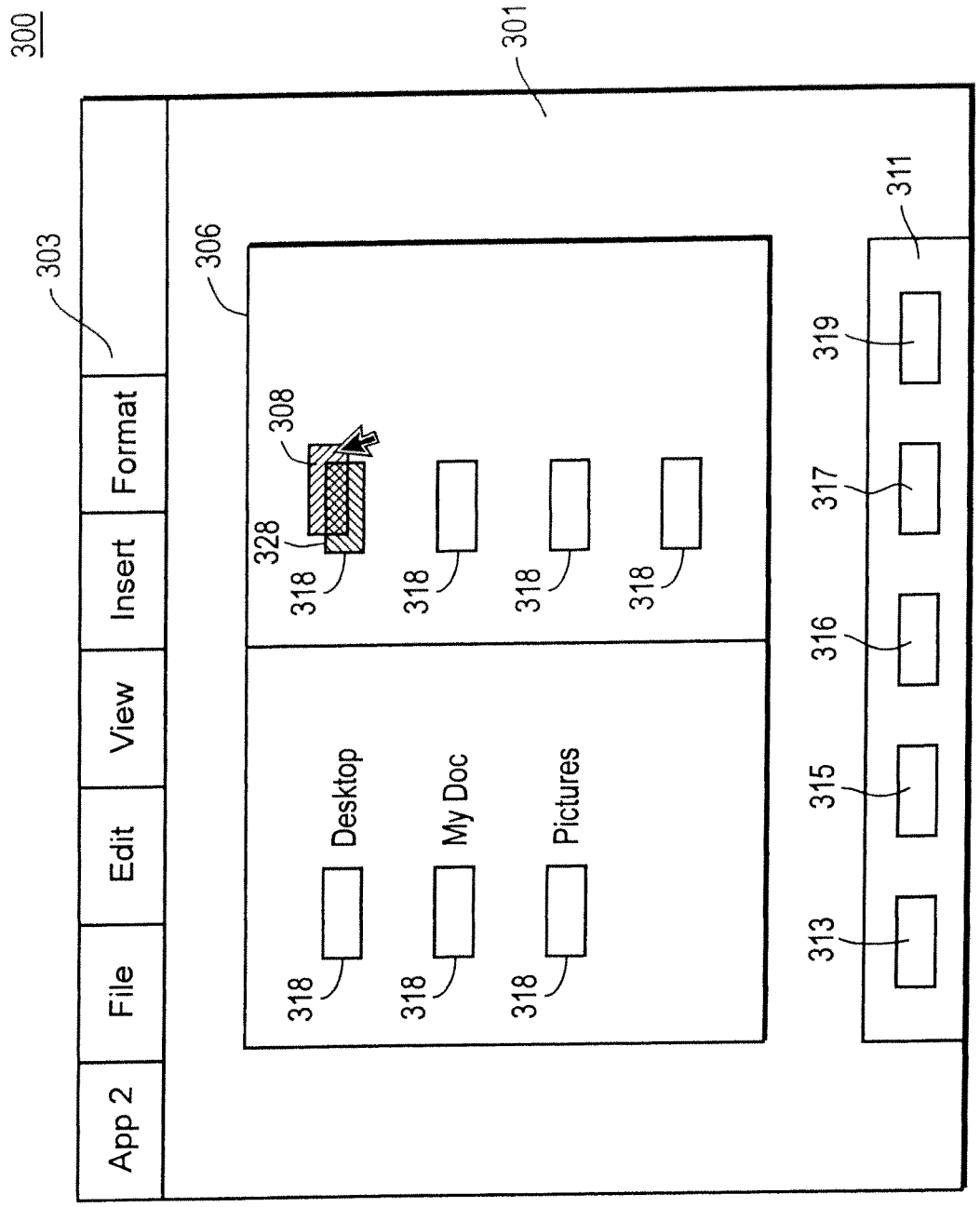
FIG. 3B shows a view similar to FIG. 3A, after an application window is displayed.

FIG. 3B shows a view similar to FIG. 3A, after a window 306 of App. 2 is displayed in response to positioning proxy 308 over item 323 to open the file.

In one embodiment, window 306 is displayed after determining whether a predetermined amount of time of positioning proxy 308 over item 323 has expired. If the predetermined time has expired, the application window 306 is automatically displayed. If the predetermined time has not yet expired, the application window 306 is not displayed. In one embodiment, the predetermined amount of time is set by the user, and can be in the approximate range of 0-20 seconds.

As shown in FIG. 3B, window 306 contains one or more items 318 that represent application programs, files, and folders. Proxy 308 is positioned over selected item 328 that represents a file. In one embodiment, proxy 308 is positioned over item 328 by dragging using cursor 307. In an embodiment, proxy 308 may be positioned over item 323 using, e.g., a voice command, a keypad, or any other methods known to one of ordinary skill in the art of data processing systems.

Figure 3C:
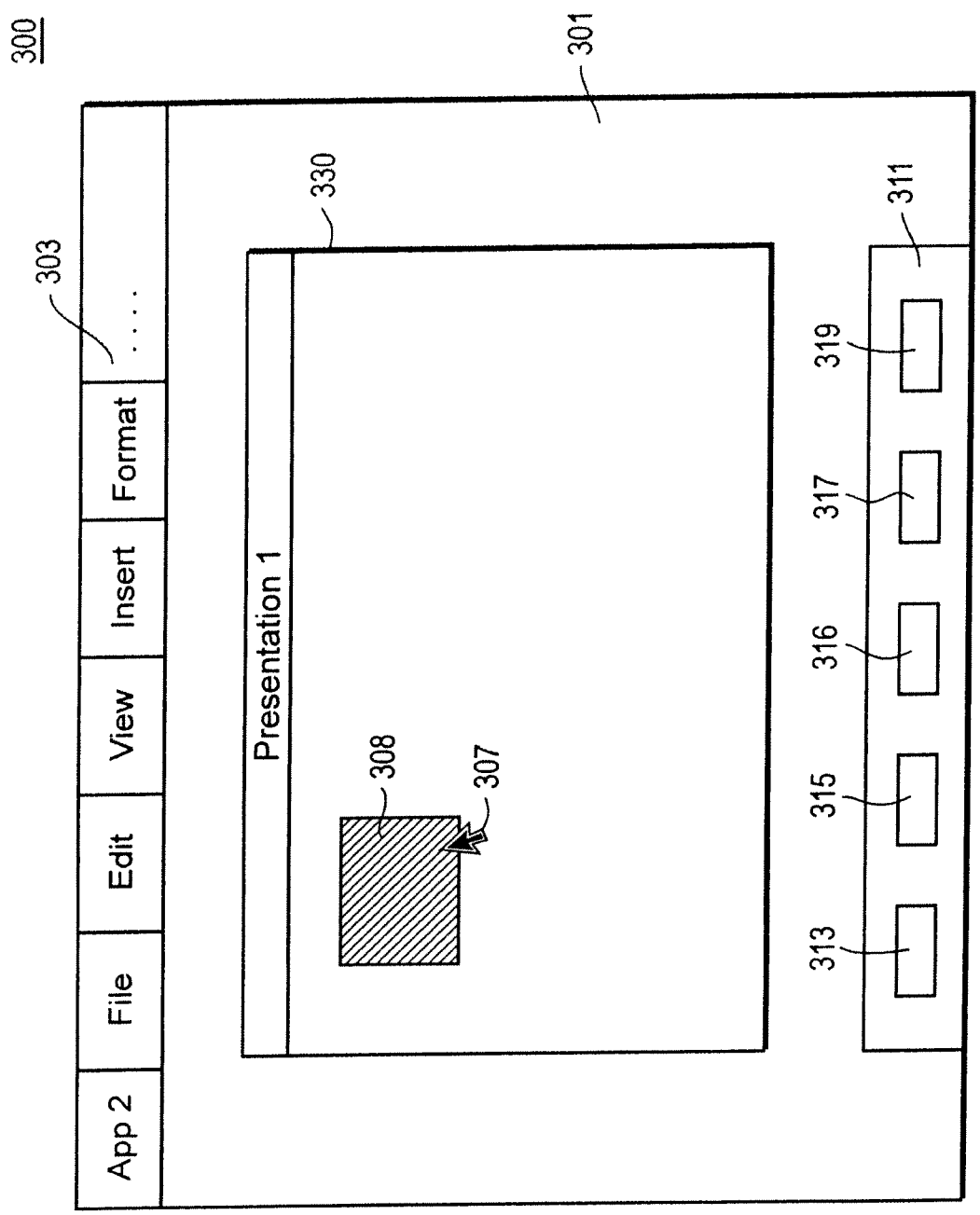
FIG. 3C shows a view similar to FIG. 3B, after a window of an opened file is displayed.

FIG. 3C shows a view similar to FIG. 3B, after a window 330 of opened file is displayed in response to positioning proxy 308 over item 328. Displaying of the window in response to positioning the proxy over the item is described above. As shown in FIG. 3C, proxy 308 is positioned into window 330. Positioning of the proxy into the window is described above.

Figure 3D:
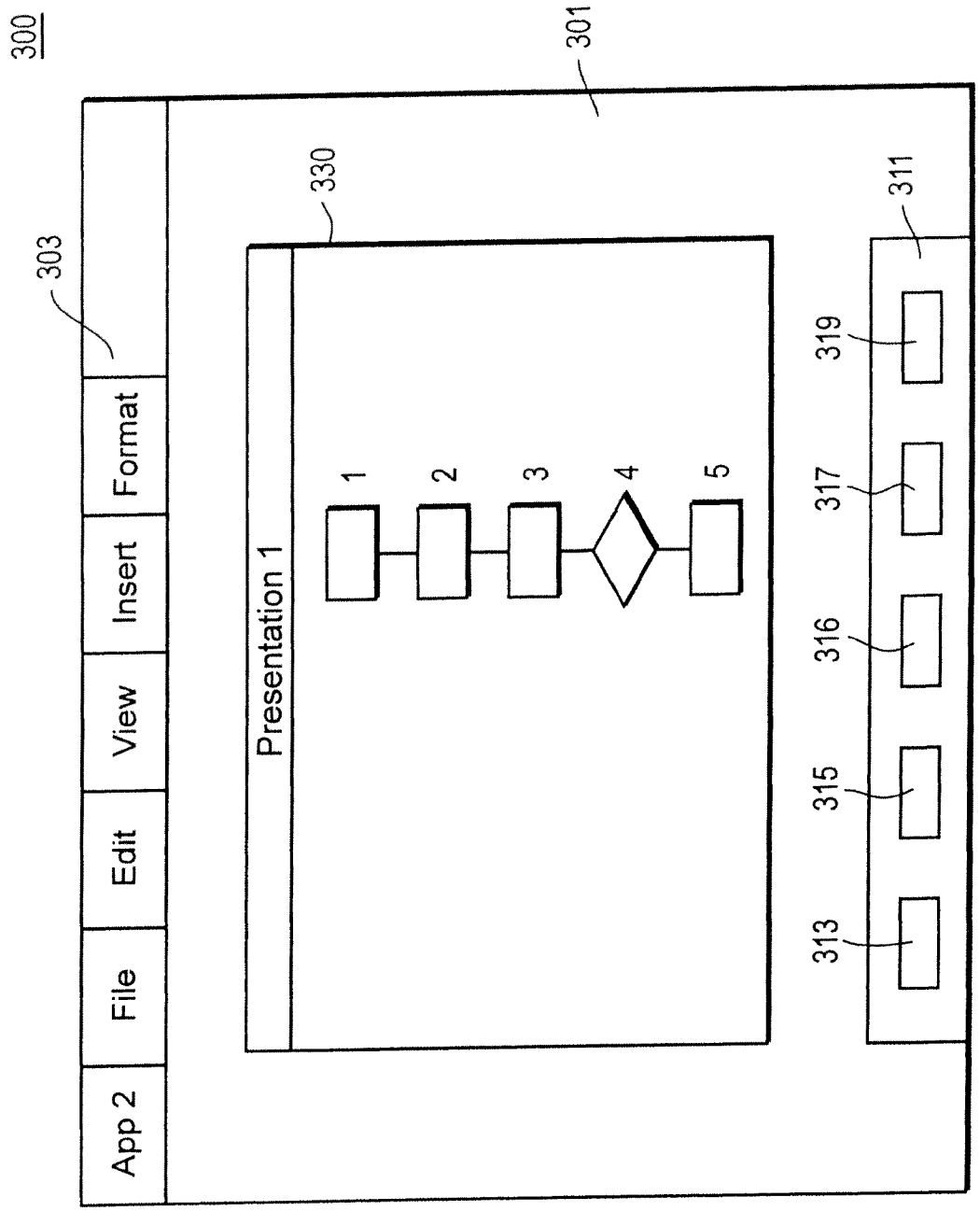
FIG. 3D shows a view similar to FIG. 3C, after a proxy is released into the window.

FIG. 3D shows a view similar to FIG. 3C, after proxy 308 is released into window 330, as described above. As shown in FIG. 3D, proxy 308 is released to insert a flowchart into the presentation window 330. In one embodiment, dragging of proxy 308 is performed continuously with a single click of the mouse button throughout the entire sequence of operations depicted in FIGS. 3A-3C.

Figure 4A:
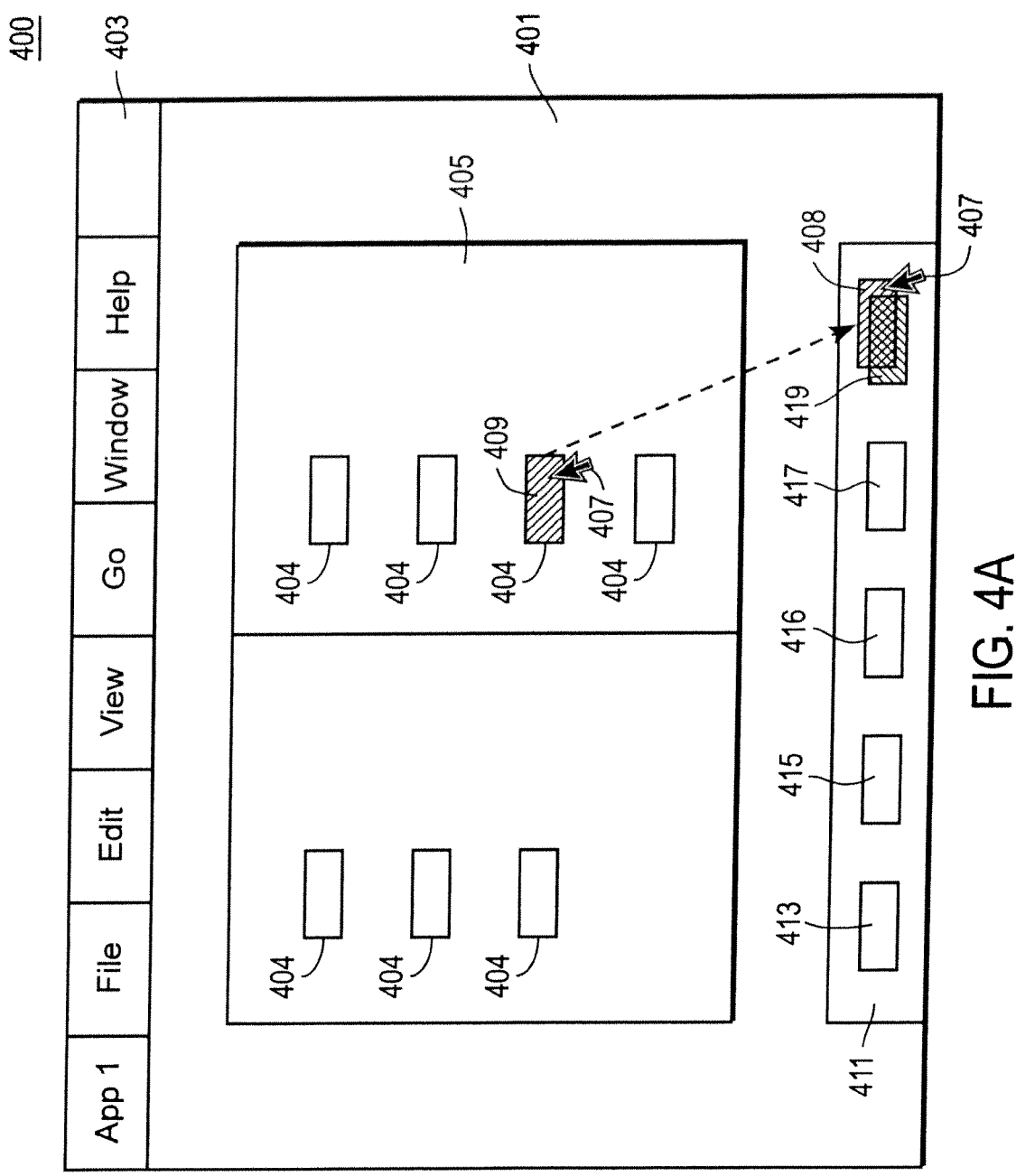
FIG. 4A shows another embodiment of a screen space of a display device of a data processing system to control application programs.

FIG. 4A shows another embodiment of a screen space of a display device of a data processing system to control application programs. As shown in FIG. 4A, a screen space 401 displays a menu 403, a docking interface 411, and an application window 405, as described above. Menu 403 displays identifiers for actions that can be performed when the application program App. 1 is executed, such as "Edit", "View", "File", and the like. Application program window 405 for App. 1 includes one or more items 404 that represent application programs, files, and folders, as shown in FIG. 4A. Docking interface 411 can include one or more items representing application programs, e.g., user level applications and system level applications, folders, URLs, and the like. As shown in FIG. 4A, docking interface 411 includes items 413, 415, 416, 417, and 419. For example, item 413 represents an application program 1 ("App. 1), item 415 represents an application program 2 ("App. 2"), item 416 represents an application 3 ("App. 3"), item 417 represents an URL, and item 419 represents a folder that can be opened using application N ("App. N"). In one embodiment, items 413, 415, 416, 417, 419 are images, e.g., icons, texts, symbols, or any combination thereof.

As shown in FIG. 4A, one of items 404 is selected to become a selected item 409. For example, selected item 409 may represent a file containing a picture, a document, a flowchart presentation, or any other content. In one embodiment, selection is performed by positioning cursor 407 over one of items 404. In another embodiment, a user performs selection by positioning a cursor 407 over one of items 404 and then pressing the mouse button. In an embodiment, selection of one or more items 404 may be performed using voice, a keypad, or any other methods known to one of ordinary skill in the art of data processing systems. In one embodiment, the selected item 409 has a proxy that can be moved over screen space 401. In one embodiment, the proxy can be created by positioning a cursor over one or the items 404 and pressing the mouse. In another embodiment, the proxy can be created using any other methods known to one of ordinary skill in the art of data processing systems. Next, proxy 408 is positioned over item 419, as shown in FIG. 4A. In one embodiment, item 419 represents a folder that can be opened using another application ("App. N").

FIG. 4B shows a view similar to FIG. 4A, after window 402 of App. N is opened to display items 423 that represent content of a folder represented by item 419. Window 402 is opened in response to positioning of proxy 408 over item 419, as described above with respect to FIGS. 1-3. As shown in FIG. 4B, proxy 408 is positioned over selected item 425 in that represents a file. Proxy 408 is positioned over selected item 425 to insert content of selected file 405 into the file 425 of folder 419. In one embodiment, the content of the selected file represented by item 409 is inserted into the folder represented by item 419. In one embodiment, file 425 can be opened to display the inserted content of the selected file 409 (not shown). In one embodiment, the content of the selected file represented by item 409 is inserted into the file 425 of folder represented by item 419 after determining whether a predetermined amount of time of positioning proxy 408 over item 425 has expired. If the predetermined time has expired, the content is automatically inserted. If the predetermined time has not yet expired, the content is not inserted. In one embodiment, the predetermined amount of time is set by the user, and can be in the approximate range of 0-20 seconds. In one embodiment, dragging of proxy 408 is performed continuously with a single click of the mouse button throughout the entire sequence of operations depicted in FIGS. 4A-4B.

Figure 5A:
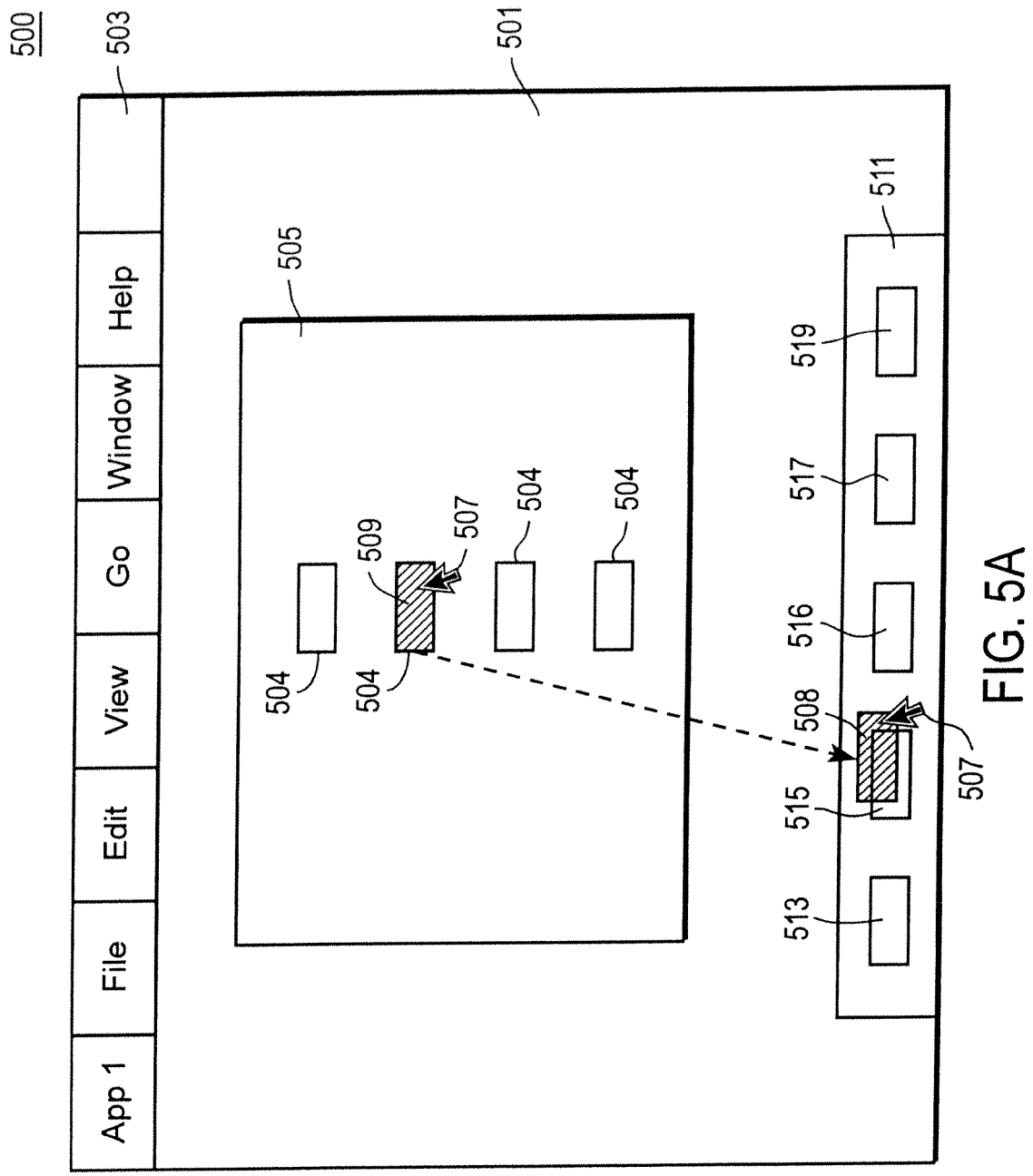
FIG. 5A shows another embodiment of a screen space of a display device of a data processing system to control application programs.

FIG. 5A shows another embodiment of a screen space of a display device of a data processing system to control application programs. As shown in FIG. 5A, a screen space 501 displays a menu 503, a docking interface 511, and an application window 505, as described above. Menu 503 displays identifiers for actions that can be performed when the application program App. 1 is executed, such as "Edit", "View", "File", and the like. Application program window 505 for App. 1 includes one or more items 504 that represent application programs, files, and folders, as shown in FIG. 5A. Docking interface 511 can include one or more items representing application programs, e.g., user level applications and system level applications, folders, URLs, and the like. As shown in FIG. 5A, docking interface 511 includes items 513, 515, 516, 517, and 519. For example, item 513 represents an application program 1 ("App. 1), item 515 represents an application program 2 ("App. 2"), item 516 represents an application 3 ("App. 3"), item 517 represents an URL, and item 519 represents a folder that can be opened using application N ("App. N"). In one embodiment, items 513, 515, 516, 517, 519 are images, e.g., icons, texts, symbols, or any combination thereof.

As shown in FIG. 5A, one of items 504 is selected to become a selected item 509. For example, selected item 509 may represent a file containing a picture, a document, a flowchart presentation, or any other content. In one embodiment, selection is performed by positioning cursor 507 over one of items 504. In another embodiment, a user performs selection by positioning a cursor 507 over one of items 505 and then pressing the mouse button. In an embodiment, selection of one or more items 505 may be performed using a voice, a keypad, or any other method known to one of ordinary skill in the art of data processing systems. In one embodiment, the selected item 509 has a proxy that can be moved over screen space 501, as described above. Next, proxy 508 is positioned over item 515, as shown in FIG. 5A. In one embodiment, item 515 represents an application program App. 2a.

Figure 5B:
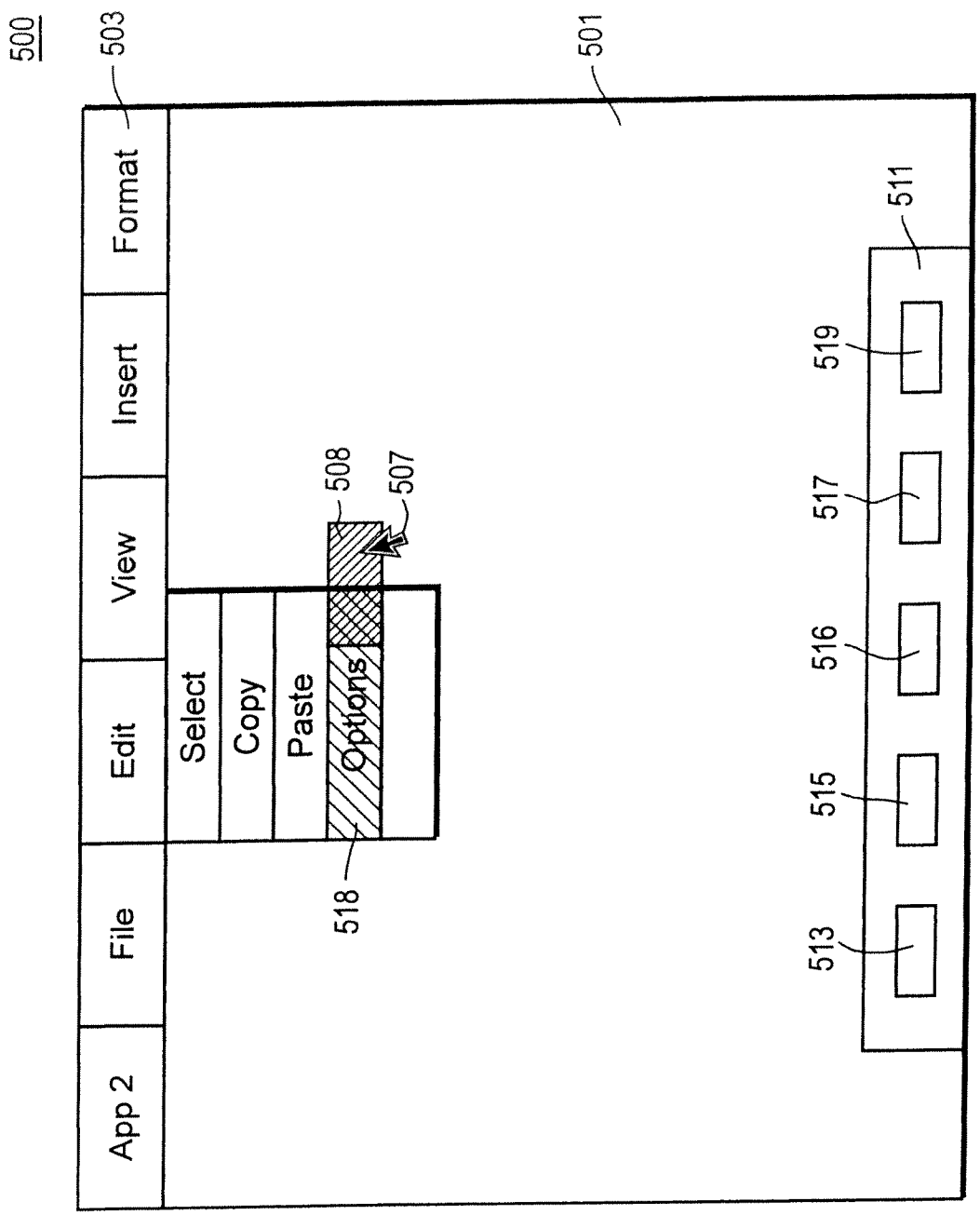
FIG. 5B shows a view similar to FIG. 5A, after an application is sprung in response to positioning of a proxy over an item within a dock.

FIG. 5B shows a view similar to FIG. 5A, after App. 2 is sprung in response to positioning of the proxy 508 over item 515, as described above with respect to FIGS. 1-3. Next, proxy 508 is positioned over a menu item 518, as shown in FIG. 5B. In one embodiment, menu item 518 represents functions that can be performed by executing App. 2, e.g., editing options, e.g., formatting, spell check, track changes options, and the like.

Figure 5C:
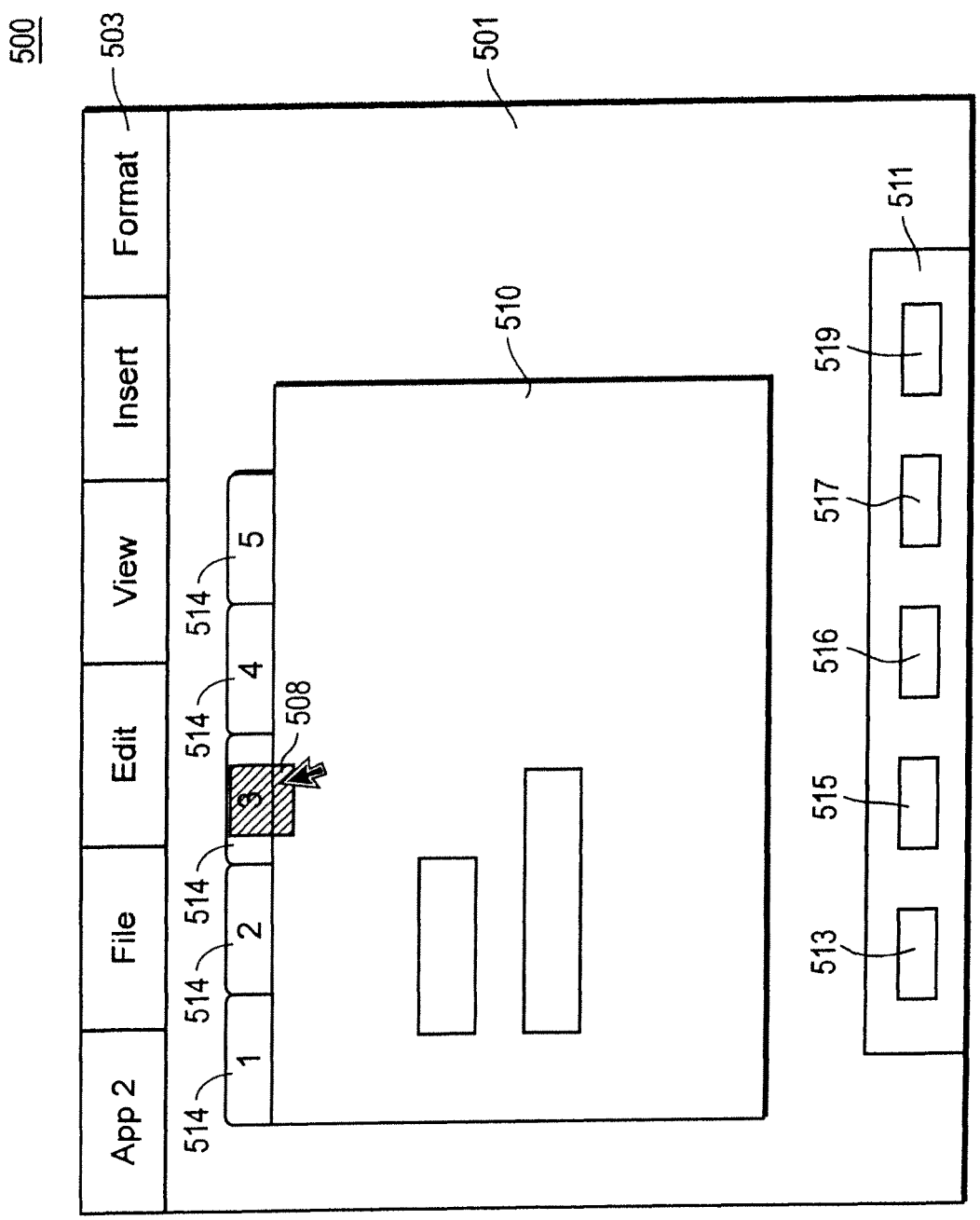
FIG. 5C shows a view similar to FIG. 5B, after an application window is displayed.

FIG. 5C shows a view similar to FIG. 5B, after pane (window) 510 of App. 2 is displayed in response to positioning of proxy 508 over item 518, as described above with respect to FIGS. 1-3. As shown in FIG. 5C, window 512 has tabs 514 that represent hidden interfaces. The hidden interfaces may represent various interfaces for various functions, e.g., tab 1 represents formatting interface, tab 2 represents a paragraph interface, tab 3 represents a spelling interface, and tab 4 represents a tracking feature interface For example, proxy 508 representing a file containing a document is positioned over one of tabs 514 (tab 3) that represents a command to perform in a spell check.

Figure 5D:
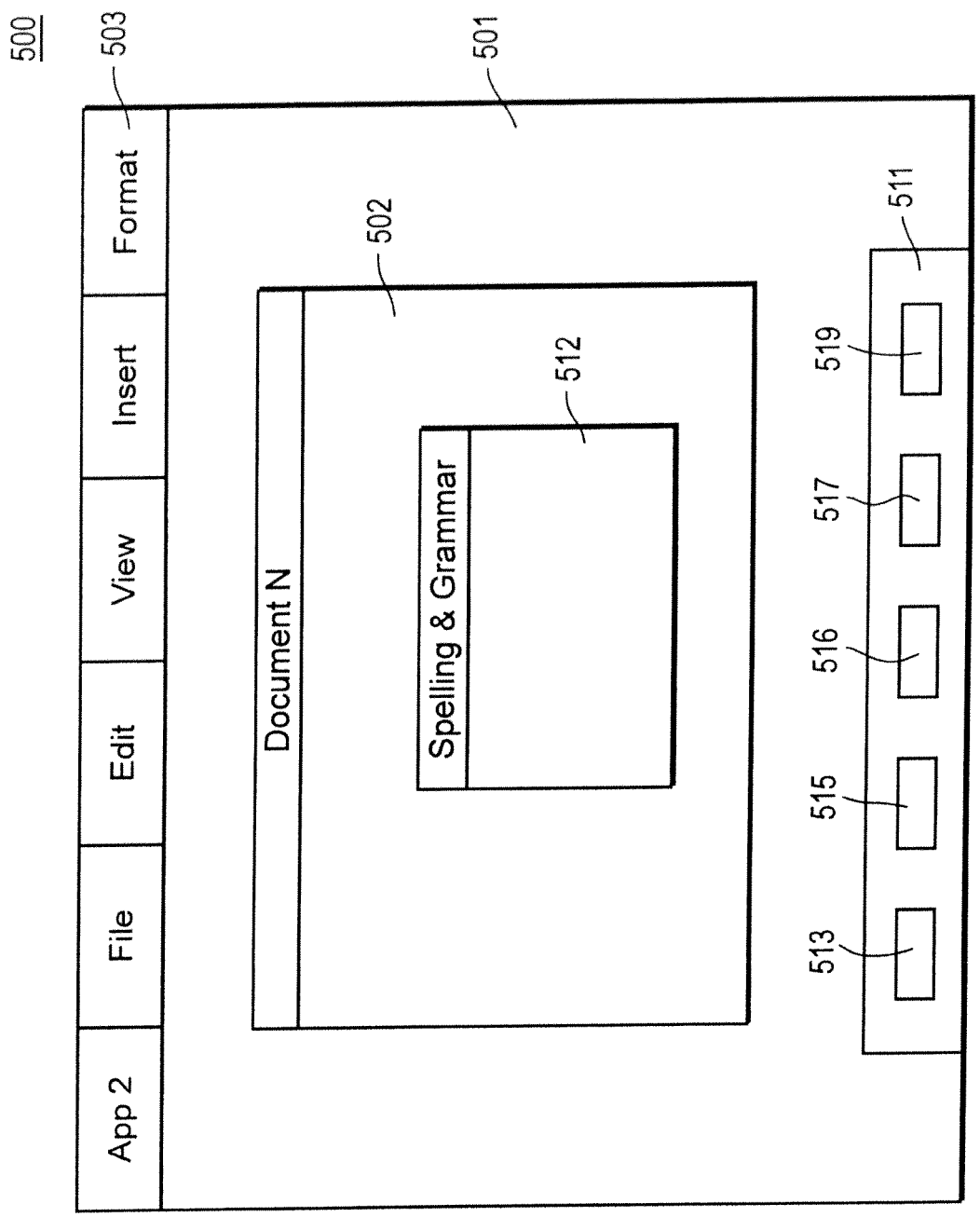
FIG. 5D shows a view similar to FIG. 5C, after a document represented by the proxy is displayed.

FIG. 5D shows a view similar to FIG. 5C, after a document 502 represented by proxy 508 is displayed, so an action represented by tab 3 of items 514 is performed in response to positioning proxy 508 over tab 3 of items 514. As shown in FIG. 5D, pane 512 is displayed to perform spell check of document 502.

In one embodiment, pane 512 is displayed after determining whether a predetermined amount of time of positioning proxy 508 over item 523 has expired. If the predetermined time has expired, the application window 506 is automatically displayed. If the predetermined time has not yet expired, the application window 506 is not displayed. In one embodiment, the predetermined amount of time is set by the user, and can be in the approximate range of 0-20 seconds. In one embodiment, dragging of proxy 508 is performed continuously with a single click of the mouse button throughout the entire sequence of operations depicted in FIGS. 5A-5D.

Figure 6:
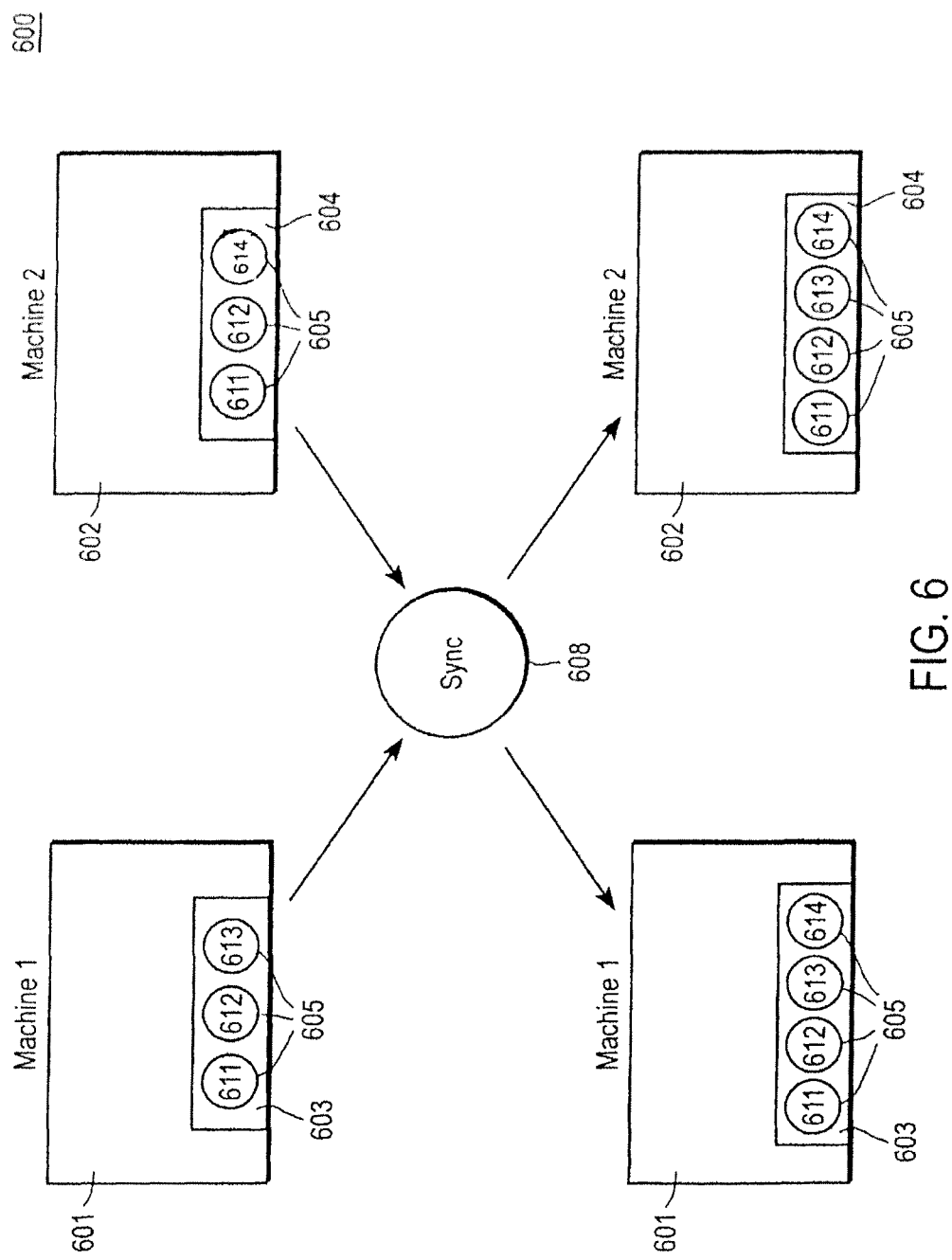
FIG. 6 shows one embodiment of a data processing system to control application programs that includes dock synchronizing ("syncing")

FIG. 6 shows one embodiment of a data processing system to control application programs that includes dock synchronizing ("syncing"). As shown in FIG. 6, the data processing system 600 includes Machine 1 and Machine 2. Machine 1 has a display device with a screen space 601 and Machine 2 has a display device with a screen space 602. The machine may be any processing device, e.g., a desktop computer, laptop computers, personal digital assistants, or any other processing device. Machine 601 and machine 602 are linked together over a network, e.g., the Internet, a local area network (LAN), wide area network (WAN), home area networks (HAN), campus area networks (CAN), or any other network known to one of ordinary skill in the art of data processing systems.

As shown in FIG. 6, screen space 601 displays a dock 603, and screen space displays a dock 604. Each of dock 603 and dock 604 has one or more items 605 representing application programs, e.g., user level applications and system level applications, folders, URLs, and the like. As shown in FIG. 6, dock 603 includes items 611, 612, and 613 and dock 604 has items 611, 612, and 614. For example, item 611 represents an URL, item 612 represents a folder, item 613 represents an application program 1 ("App. 1), and item 614 represents an application program 2 ("App. 2"). In one embodiment, items 605 are images, e.g., icons, texts, symbols, or any combination thereof. In one embodiment, both App. 1 and App. 2 are supported by each of Machine 1 and Machine 2.

Figure 11:
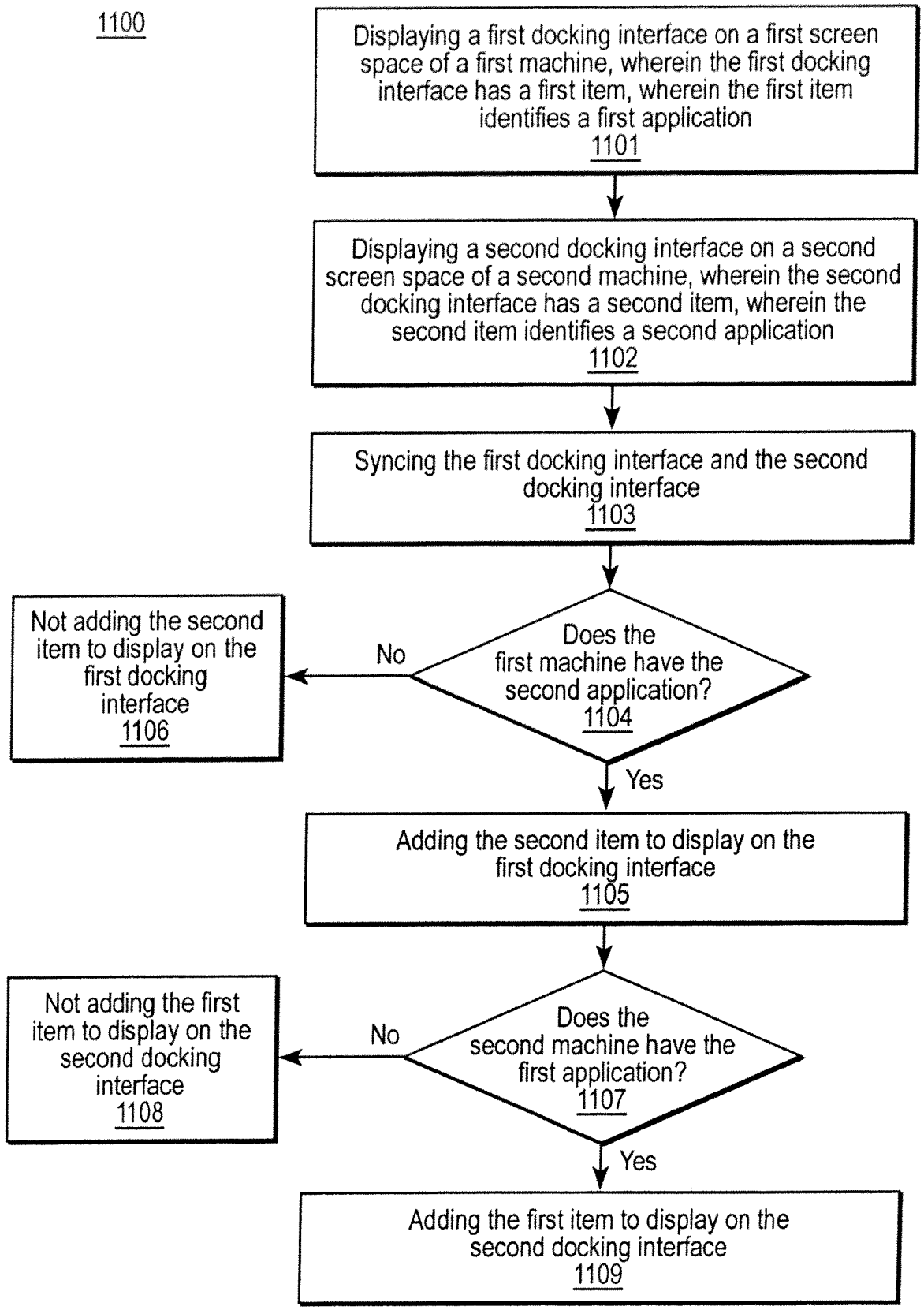
FIG. 11 is a flowchart of one embodiment of a method to control application programs that includes dock syncing.

FIG. 11 is a flowchart of one embodiment of a method to control application programs that includes dock syncing. Method 1100 begins with operation 1101 that involves displaying a first docking interface on a first screen space of a first machine, wherein the first docking interface has a first item, wherein the first item identifies a first application. Next, operation 1102 that involves displaying a second docking interface on a second screen space of a second machine, wherein the second docking interface has a second item, wherein the second item identifies a second application is performed, as described above with respect to FIG. 6. Next, operation 1103 is performed that involves synchronizing the first docking interface and the second docking interface. Dock syncing is a process of making the docking interfaces on multiple machines the same. Synchronizing of the items of the docks ensures that the content of a user's dock, e.g., applications, folders, documents, URLs, and the like, is updated to be the same as the content of the Dock's of other machines that are coupled to the user's machine over a network.

In one embodiment, synchronizing a dock of a machine to another dock of another machine is performed periodically over a period of time. In another embodiment, synchronizing of a dock of a machine to another dock of another machine is performed per a request of a user of the machine. In one embodiment, the priority of syncing the dock of a machine to another dock of another machine is determined by a user of the machine. Next, operation 1104 is performed that involves determining whether the first machine supports the second application. If the first machine supports the second application, the second item is added to display on the first docking interface in operation 1105. If the first machine does not support the second application, the second item is not added to be displayed on the first docking interface in operation 1106. Method continues with operation 1107 that involves determining if the second machine supports the first application. If the second machine supports the first application, the first item is added to display on the second docking interface in operation 1109. If the second machine does not support the first application, the first item is not added to display on the second docking interface in operation 1108.

After synchronizing 608 has been performed, item 614 representing App. 1 is displayed on dock 603, and item 613 is displayed on dock 604, so that content of both docks 603 and 604 is updated to be the same, as shown in FIG. 6. In one embodiment, a position of item 613 within docking interface 603 after syncing is the same as a position of item 613 within docking interface 604. In another embodiment, a position of item 613 within docking interface 603 after dock syncing is adjusted depending on a position of another item 614 within docking interface 604. In one embodiment, items 611-614 are reordered after dock syncing 608. In one embodiment, after dock syncing 608, a display order of items 611-614 is modified such that items 611-614 are displayed in the same order on all machines. In another embodiment, the display order of items 611-614 is modified such that items 611-614 have different display order on the machines according to user preferences.

Figure 12:
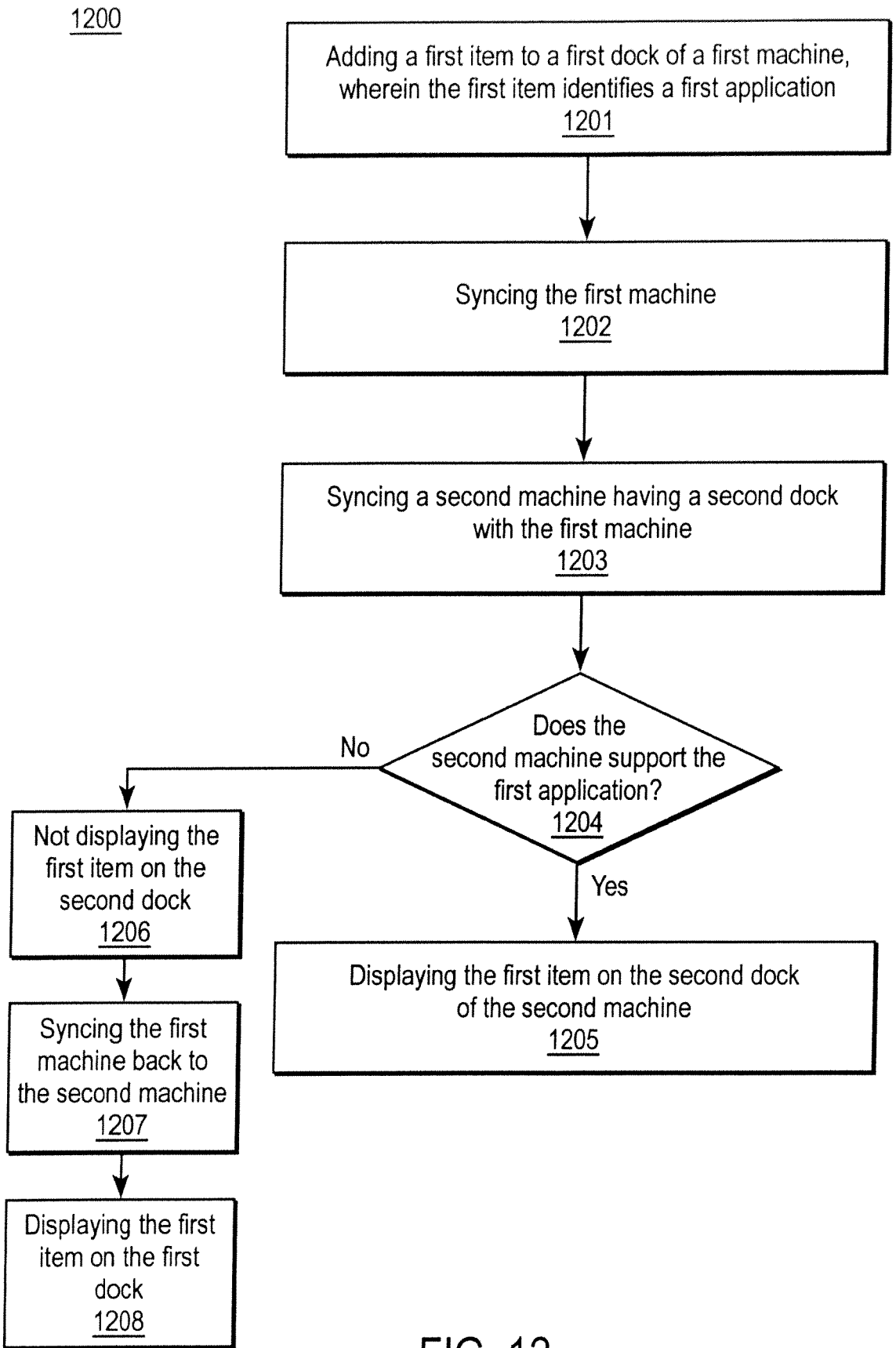
FIG. 12 is a flowchart of another embodiment of a method to control application programs that includes dock syncing.

FIG. 12 is a flowchart of another embodiment of a method to control application programs that includes dock syncing. Method 1200 begins with operation 1201 that involves adding a first item to a first dock of a first machine, wherein the first item identifies a first application. Next, operation 1202 of synchronizing of the first machine is performed. In one embodiment, synchronizing of the first machine is performed using MAC OS X ("Trademark") Sync Services provided by Apple Computer, Inc located in Cupertino, Calif.

In one embodiment, synchronizing from the first machine to a second machine that has a second dock is performed. Next, operation 1203 is performed that involves synchronizing the second machine having a second dock with the first machine. Next, opera ion 1204 that involves determining whether the second machine support the first application is performed. If the second machine supports the first application, the first item is displayed on the second dock of the second machine in operation 1205. If the second machine does not support the first application, the first item is recorded as "missing item" and is not displayed on the second dock in operation 1206. Further, if the synchronizing is performed back from the first machine to the second machine in operation 1207, the first item is not modified on the dock of the first machine in operation 1208. As such, the first machine does not know that the first item is "missing" from the second dock, so the first item is not removed from the first dock after synchronizing back the first machine to the second machine. That is, the respective docks of multiple machines having disparate applications can be still synced without a fear of dock data loss. Methods described above with respect to FIGS. 11 and 12 can be performed for synchronizing dashboard interfaces of a plurality of machines that support disparate application.

For example, a user adds a new application 613 (e.g., TextEdit) to dock 603 of Machine 1. Next the user syncs Machine 1 over a network. Next, when machine 2 performs synchronizing over the network, new application 613 is displayed on dock 604, as shown in FIG. 6.

Figure 7:
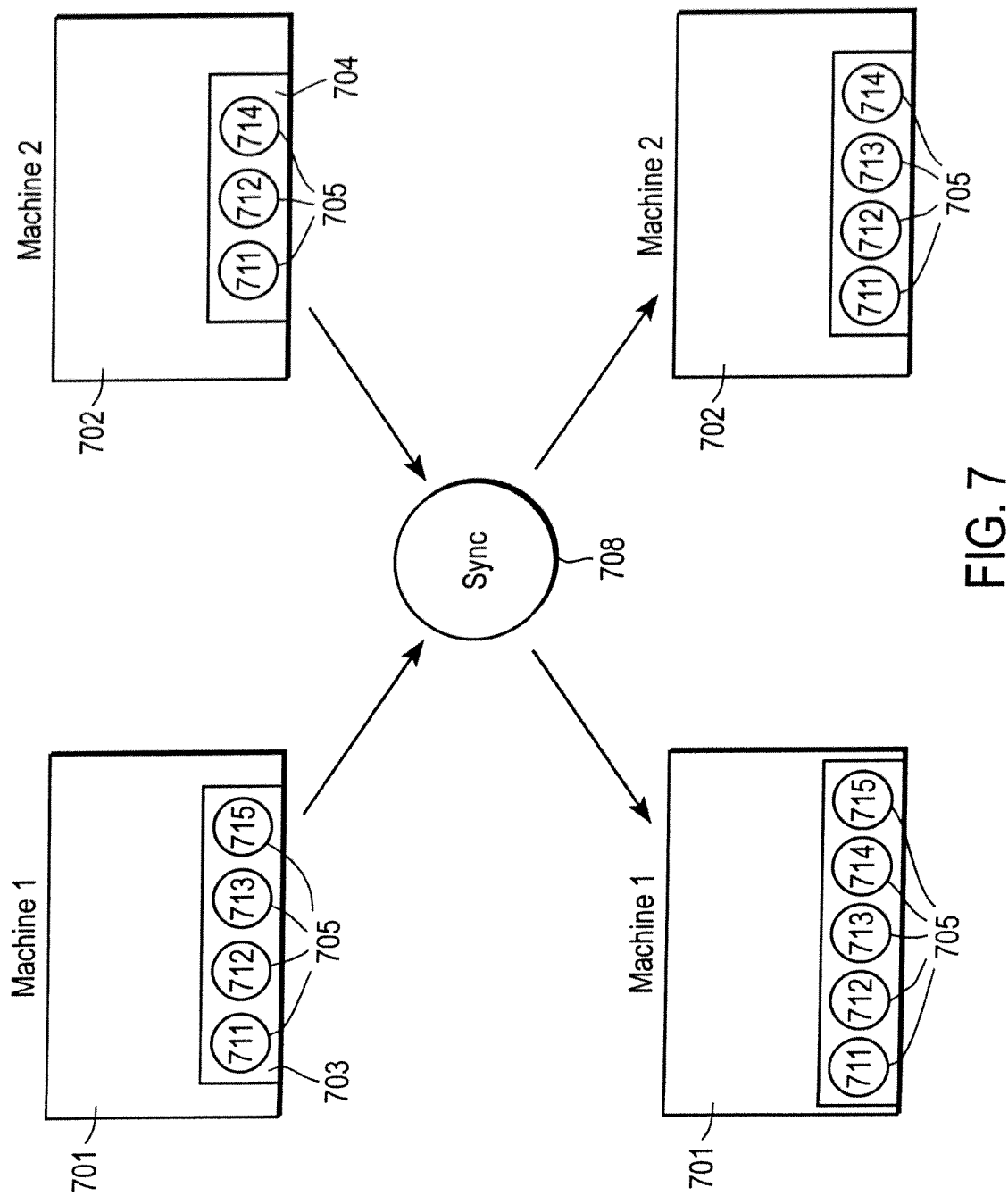
FIG. 7 shows one embodiment of a data processing system to control application programs that includes dock syncing.

FIG. 7 shows one embodiment of a data processing system to control application programs that includes dock syncing. As shown in FIG. 7, the data processing system 700 includes Machine 1 and Machine 2. Machine 1 has a display device with a screen space 701 and Machine 2 has a display device with a screen space 702. The machine may be any processing device, e.g., a desktop computer, laptop computers, personal digital assistants, or any other processing device. Machine 701 and machine 702 are linked together over a network, e.g., the Internet, a local area network (LAN), wide area network (WAN), home area networks (HAN), campus area networks (CAN), or any other network known to one of ordinary skill in the art of data processing systems.

As shown in FIG. 7, screen space 701 displays a dock 703, and screen space displays a dock 704. Each of dock 703 and dock 704 has one or more items 705 representing application programs, e.g., user level applications and system level applications, folders, URLs, and the like. As shown in FIG. 7, dock 703 includes items 711, 712, 713, and 715 and dock 704 has items 711, 712, and 714. For example, item 711 represents an URL, item 712 represents a folder, item 713 represents an application program 1 ("App. 1), item 714 represents an application program 2 ("App. 2"), and item 715 represents an application program 3 ("App. 3"), e.g., Adobe Photoshop®. In one embodiment, items 705 are images, e.g., icons, texts, symbols, or any combination thereof. In one embodiment, App. 1, App. 2, and App. 3 are supported by Machine 1. Machine 2 supports App. 1 and App. 2, but does not support App. 3.

After syncing 708 has been performed, contents of both docks 703 and 704 are updated, as shown in FIG. 7. As shown in FIG. 7, items 711-715 that are supported by Machine 1 are displayed on dock 703, and items 711-714 that are supported by Machine 2 are displayed on dock 704. Item 715 that is not supported by Machine 2 is not displayed on dock 704.

Figure 8:
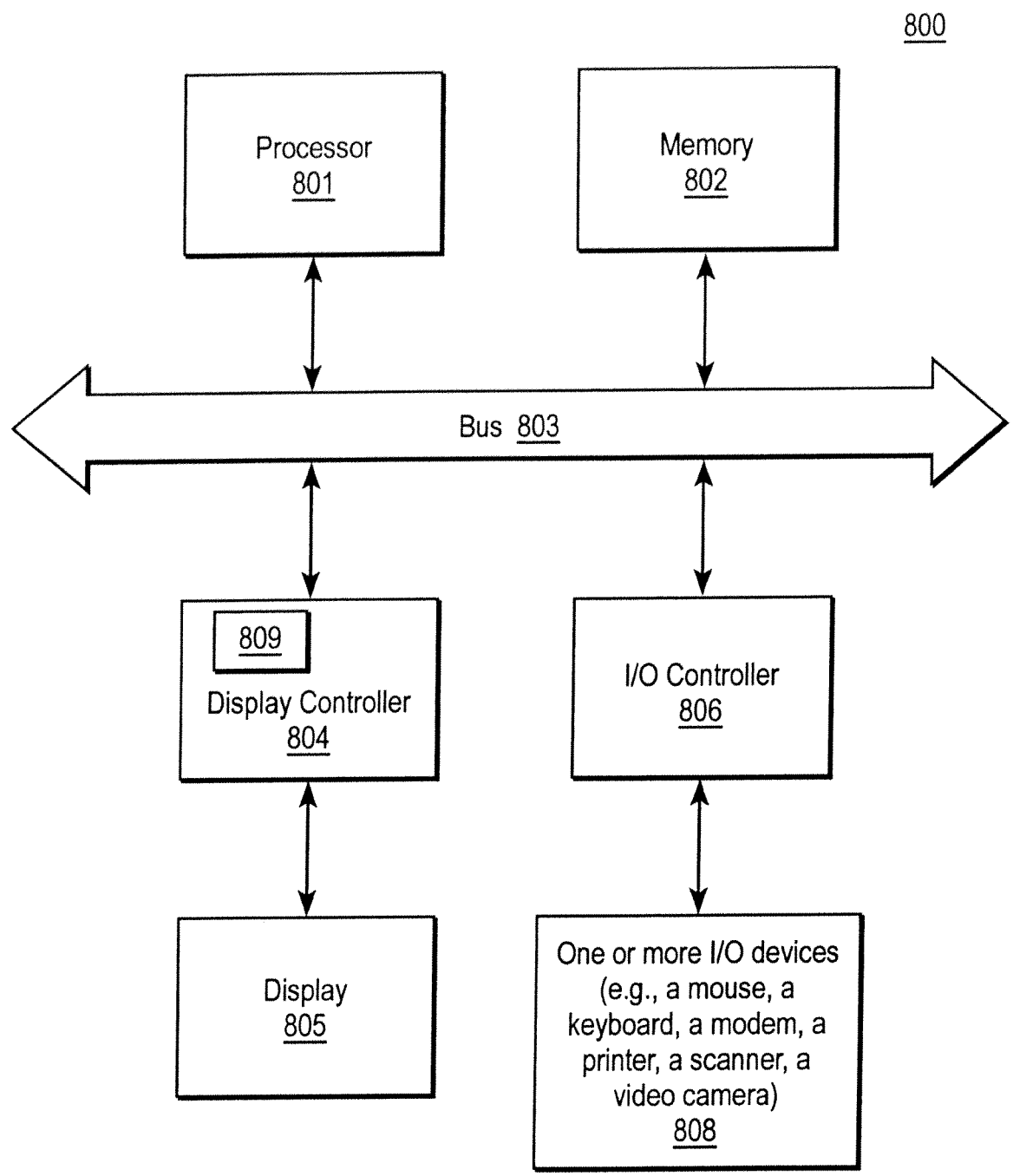
FIG. 8 shows a block diagram of one embodiment of a data processing system 800 that performs methods described above with respect to FIGS. 1-7, and 9-12.

FIG. 8 shows a block diagram of one embodiment of a data processing system 800 that performs methods described above with respect to FIGS. 1-7, and 9-12. System 800 may be a general purpose computer system, a special purpose data processing system, a PDA, a cellular telephone, or a media player. System 800 includes a processor 801 coupled to a memory 802 using a bus 803. In one embodiment, memory 802 is a magnetic disk, an optical disk, a flash memory chip, a hard disk, a dynamic random access memory ("DRAM"), a battery backed memory, or any combination thereof. In one embodiment, the memory 802 includes a portable disk, such as a CD-ROM, a DVD, or a floppy disk. Processor 801 executes the software written onto the memory 802 to perform the methods of controlling application programs on a screen space as described above. As shown in FIG. 8, processor 801 and memory 802 are coupled through bus 803 to an input/output ("I/O") controller 806 and to a display controller 805. As shown in FIG. 8, I/O controller 806 is coupled to one or more input/output devices 808, e.g., a mouse or other cursor control device, a keyboard, a modem, a printer, and a video camera to provide communication with a user. As shown in FIG. 8, a display controller 805 is coupled to a display device 805 to display for example, a docking interface having one or more items representing application programs, folders, Universal Address Locators ("URLs"), one or more application windows, wherein the methods described above, are performed.

In one embodiment, display controller 805 includes a video adapter (e.g., video card, video board, video display board, graphics card, and graphics adapter) to produce the visual output from a data processing system. In one embodiment, display controller 805 includes a video adapter that contains a memory 809, e.g., a frame buffer, for holding texts and graphics sent to display device 805 for display. Software that includes programs, e.g., a Drag Manager (not shown) and data to perform methods of controlling application programs on a screen space as described above with respect to FIGS. 1-7, 9-12, is written onto memory 802, memory 809, or both. In one embodiment, a Drag Manager controls positioning of a proxy over one or more items as described above. Further, the video adapter of display controller 805 relays the information received from the programs and applications running on the data processing system to display device 805 that allows a user to view the information and images on a screen of the display device 805. In one embodiment, display controller 805 includes a video adapter that has a graphics coprocessor (graphics accelerator), for performing graphics calculations. The graphics accelerator may have memory 809 that may be faster than memory 802. The amount of memory determines how much resolution and how many colors can be displayed. Memory 802 and/or memory 809 may be dynamic random access memory (DRAM), or video RAM, which enables both the video circuitry and the processor to simultaneously access the memory. In one embodiment, display controller 805 having graphics accelerator (not shown) may be coupled to memory 802 through a video bus e.g., PCI or Accelerated Graphics Port (AGP).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method, comprising:
at a computing device with a display and one or more input devices:
concurrently displaying, on the display, a first item within a first window that corresponds to a first application and an application launch icon that corresponds to a second application, wherein:
the application launch icon is displayed in a dock element that is separate from the first window;
the first application and the second application correspond to different applications; and
the first item corresponds to a representation of respective content;
detecting, via the one or more input devices, an input that corresponds to movement of a proxy of the first item to a position that is at least partially over the application launch icon that corresponds to the second application;
in response to detecting the proxy of the first item at a position that is at least partially over the application launch icon that corresponds to the second application for a predetermined period of time, displaying, on the display, a second window of the second application that corresponds to the application launch icon, wherein:
the second window was not displayed on the display prior to the proxy of the first item being positioned over the application launch icon; and
the second window is displayed concurrently with displaying the application launch icon that corresponds to the second application in the dock element;
subsequent to displaying the second window of the second application that corresponds to the application launch icon, detecting, via the one or more input devices, a continuation of the input that corresponds to a continuation of the movement of the proxy of the first item on the display;
in response to detecting the continuation of the input:
in accordance with a determination that the continuation of the input corresponds to movement of the proxy of the first item over the second window of the second application that corresponds to the application launch icon in the dock element:
maintaining display of the second window of the second application that corresponds to the application launch icon in the dock element; and
displaying the respective content within the second window in response to detecting release of the input while the proxy of the first item is over the second window; and
in accordance with a determination that the continuation of the input corresponds to movement of the proxy of the first item to a position on the display that is outside of the second window of the second application that corresponds to the application launch icon in the dock element, ceasing to display the second window of the second application that corresponds to the application launch icon in the dock element.

2. The method of claim 1, wherein detecting the continuation of the input includes detecting dragging of the proxy of the first item.

3. The method of claim 1, wherein the displaying the second window includes displaying a command interface within the second window, the command interface presented by the second application; and
  wherein detecting continuation of the movement of the proxy of the first item includes detecting movement of the proxy of the first item over the command interface within the second window to trigger an associated command.

4. The machine implemented method of claim 1, wherein detecting the continuation of the positioning includes detecting positioning of the proxy over a command interface within the second window of the second application.

5. The machine implemented method of claim 4, further comprising in response to detecting positioning of the proxy over the command interface for a predetermined period of time, activating a command associated with the command interface.

6. The machine implemented method of claim 5, further comprising in response to activating the command, displaying a new window of the second application; and
  subsequent to displaying the second window, detecting continuation of the positioning of the proxy of the first item over the new window.

7. The method of claim 1, wherein the displaying the second window includes displaying a second item within the second window;
  wherein detecting continuation of the movement of the proxy of the first item includes detecting movement of the proxy of the first item over the second item; and the method further comprising:
    determining whether the first item is a proper item;
    in accordance with a determination that the first item is a proper item, receiving the first item within the second window of the second application; and
    in accordance with a determination that the first item is not a proper item, dropping the first item outside the second window of the second application.

8. The method of claim 1, further comprising, before displaying the second window of the second application, determining whether the respective content corresponding to the first item is compatible with the second application corresponding to the application launch icon in the dock element; and
  in accordance with a determination that the respective content corresponding to the first item is compatible with the second application corresponding to the application launch icon in the dock element, displaying, on the display, the second window.

9. The method of claim 1, wherein the first item is maintained in the first window while the proxy of the first item is moved to the position that is at least partially over the application launch icon that corresponds to the second application, and wherein the first item is maintained in the first window while the proxy of the first item is continued to be moved over the second window of the second application.

10. An article of manufacture comprising:
a non-transitory computer-readable medium including data that, when accessed by a machine, cause the machine to perform operations comprising,
at a computing device with a display and one or more input devices:
  concurrently displaying, on the display, a first item within a first window that corresponds to a first application and an application launch icon that corresponds to a second application, wherein:
    the application launch icon is displayed in a dock element that is separate from the first window;
    the first application and the second application correspond to different applications; and
    the first item corresponds to a representation of respective content;
  detecting, via the one or more input devices, an input that corresponds to movement of a proxy of the first item to a position that is at least partially over the application launch icon that corresponds to the second application;
  in response to detecting the proxy of the first item at a position that is at least partially over the application launch icon that corresponds to the second application for a predetermined period of time, displaying, on the display, a second window of the second application that corresponds to the application launch icon, wherein:
    the second window was not displayed on the display prior to the proxy of the first item being positioned over the application launch icon; and
    the second window is displayed concurrently with displaying the application launch icon that corresponds to the second application in the dock element;
  subsequent to displaying the second window of the second application that corresponds to the application launch icon, detecting, via the one or more input devices, a continuation of the input that corresponds to a continuation of the movement of the proxy of the first item on the display;
  in response to detecting the continuation of the input:
    in accordance with a determination that the continuation of the input corresponds to movement of the proxy of the first item over the second window of the second application that corresponds to the application launch icon in the dock element:
      maintaining display of the second window of the second application that corresponds to the application launch icon in the dock element; and
      displaying the respective content within the second window in response to detecting release of the input while the proxy of the first item is over the second window; and
    in accordance with a determination that the continuation of the input corresponds to movement of the proxy of the first item to a position on the display that is outside of the second window of the second application that corresponds to the application launch icon in the dock element, ceasing to display the second window of the second application that corresponds to the application launch icon in the dock element.

11. The article of manufacture of claim 10, wherein detecting the continuation of the input includes detecting dragging of the proxy of the first item.

12. The article of manufacture of claim 10, wherein the displaying the second window includes displaying a command interface within the second window, the command interface presented by the second application; and wherein detecting continuation of the movement of the proxy of the first item includes detecting movement of the proxy of the first item over the command interface to trigger an associated command.

13. The article of manufacture of claim 10, wherein the first item is maintained in the first window while the proxy of the first item is moved to the position that is at least partially over the application launch icon that corresponds to the second application, and wherein the first item is maintained in the first window while the proxy of the first item is continued to be moved over the second window of the second application.

14. The article of manufacture of claim 10, wherein the data further causes the machine to perform operation comprising:

before displaying the second window of the second application, determining whether the respective content corresponding to the first item is compatible with the second application corresponding to the application launch icon in the dock element; and in accordance with a determination that the respective content corresponding to the first item is compatible with the second application corresponding to the application launch icon in the dock element, displaying, on the display, the second window.

15. A system, comprising:

at a computing device with a display and one or more input devices:

means for concurrently displaying, on the display, a first item within a first window that corresponds to a first application and an application launch icon that corresponds to a second application, wherein:

the application launch icon is displayed in a dock element that is separate from the first window;

the first application and the second application correspond to different applications; and the first item corresponds to a representation of respective content;

means for detecting, via the one or more input devices, an input that corresponds to movement of a proxy of the first item to a position that is at least partially over the application launch icon that corresponds to the second application;

means for, in response to detecting the proxy of the first item at a position that is at least partially over the application launch icon that corresponds to the second application for a predetermined period of time, displaying, on the display, a second window of the second application that corresponds to the application launch icon, wherein:

the second window was not displayed on the display prior to the proxy of the first item being positioned over the application launch icon; and the second window is displayed concurrently with displaying the application launch icon that corresponds to the second application in the dock element;

means for, subsequent to displaying the second window of the second application that corresponds to the application launch icon, detecting, via the one or more input devices, a continuation of the input that corresponds to a continuation of the movement of the proxy of the first item on the display in response to detecting the continuation of the input:

in accordance with a determination that the continuation of the input corresponds to movement of the proxy of the first item over the second window of the second application that corresponds to the application launch icon in the dock element:

means for maintaining display of the second window of the second application that corresponds to the application launch icon in the dock element; and means for displaying the respective content within the second window in response to detecting release of the input while the proxy of the first item is over the second window; and in accordance with a determination that the continuation of the input corresponds to movement of the proxy of the first item to a position on the display that is outside of the second window of the second application that corresponds to the application launch icon in the dock element, means for ceasing to display the second window of the second application that corresponds to the application launch icon in the dock element.

16. The system of claim 15, wherein the first item is maintained in the first window while the proxy of the first item is moved to the position that is at least partially over the application launch icon that corresponds to the second application, and wherein the first item is maintained in the first window while the proxy of the first item is continued to be moved over the second window of the second application.

17. The system of claim 15, further comprising:

before displaying the second window of the second application, means for determining whether the respective content corresponding to the first item is compatible with the second application corresponding to the application launch icon in the dock element; and in accordance with a determination that the respective content corresponding to the first item is compatible with the second application corresponding to the application launch icon in the dock element, means for displaying, on the display, the second window.

* * * * *